United States Patent
Dudar

(10) Patent No.: US 10,408,143 B2
(45) Date of Patent: Sep. 10, 2019

(54) SYSTEMS AND METHODS FOR IMPROVING FUEL VAPOR CANISTER PURGING OPERATIONS IN A PHEV

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 66 days.

(21) Appl. No.: 15/887,465

(22) Filed: Feb. 2, 2018

(65) Prior Publication Data

US 2019/0242310 A1 Aug. 8, 2019

(51) Int. Cl.
| | |
|---|---|
| *F02D 41/00* | (2006.01) |
| *B60W 20/00* | (2016.01) |
| *B60W 10/08* | (2006.01) |
| *B60W 10/06* | (2006.01) |
| *F02D 41/22* | (2006.01) |
| *F01M 13/02* | (2006.01) |
| *F01M 13/00* | (2006.01) |
| *F02D 41/26* | (2006.01) |

(52) U.S. Cl.
CPC ......... *F02D 41/0032* (2013.01); *B60W 10/06* (2013.01); *B60W 10/08* (2013.01); *B60W 20/00* (2013.01); *F01M 13/0011* (2013.01); *F01M 13/021* (2013.01); *F02D 41/0045* (2013.01); *F02D 41/222* (2013.01); *B60W 2710/0605* (2013.01); *B60W 2710/08* (2013.01); *F02D 41/26* (2013.01)

(58) Field of Classification Search
CPC ............... F02D 41/0032; F02D 41/222; F02D 41/0045; F02D 41/26; B60W 20/00; B60W 10/08; B60W 10/06; B60W 2710/0605; B60W 2710/08; F01M 13/0011; F01M 13/021
USPC ........................................................ 701/22
See application file for complete search history.

(56) References Cited

U.S. PATENT DOCUMENTS

| | | |
|---|---|---|
| 9,080,525 B2 | 7/2015 | Jankovic |
| 9,366,197 B2 | 6/2016 | Hakeem et al. |
| 9,651,002 B2 | 5/2017 | Dudar |

(Continued)

OTHER PUBLICATIONS

"Delphi Hydrocarbon Sensor," Delphi Automotive Website, Available Online at https://web.archive.org/web/20120517170345/http://delphi.com/shared/pdf/ppd/pwrelec/hydrocarbon-sensor.pdf, Available as Early as May 17, 2012, 2 pages.

*Primary Examiner* — Marthe Y Marc-Coleman
(74) *Attorney, Agent, or Firm* — Julia Voutyras; McCoy Russell LLP

(57) ABSTRACT

Methods and systems are provided for rationalizing a hydrocarbon sensor in a hybrid vehicle, the hydrocarbon sensor used for feed-forward air/fuel ratio control during fuel vapor canister purging events. In one example, a method comprises routing blow-by gasses from a crankcase of an engine of the vehicle to an intake manifold of the engine and then to a fuel vapor storage canister, and indicating whether the hydrocarbon sensor is functioning as desired based on a magnitude of a response of the hydrocarbon sensor during the routing. In this way, the hydrocarbon sensor may be diagnosed under conditions when the canister is substantially free from fuel vapors, and where engine run-time is limited.

20 Claims, 6 Drawing Sheets

(56) References Cited

U.S. PATENT DOCUMENTS

| | | | |
|---|---|---|---|
| 2014/0123961 A1* | 5/2014 | Kragh | F02M 25/0836 123/520 |
| 2015/0051811 A1* | 2/2015 | Song | F02D 41/144 701/104 |
| 2015/0322901 A1* | 11/2015 | Kragh | F02M 25/08 123/520 |
| 2017/0002761 A1 | 1/2017 | Dudar | |
| 2017/0082043 A1 | 3/2017 | Dudar | |

* cited by examiner

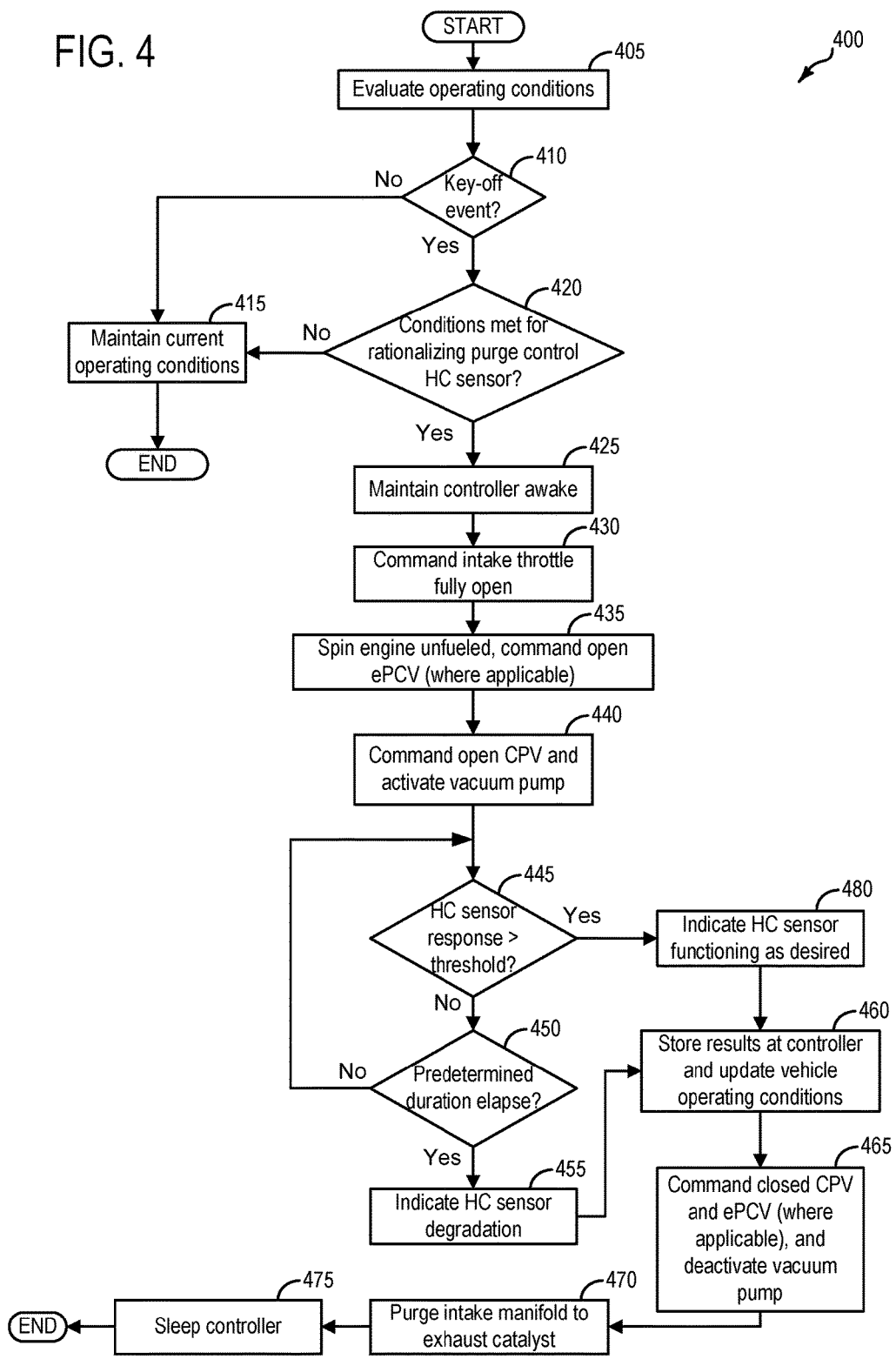

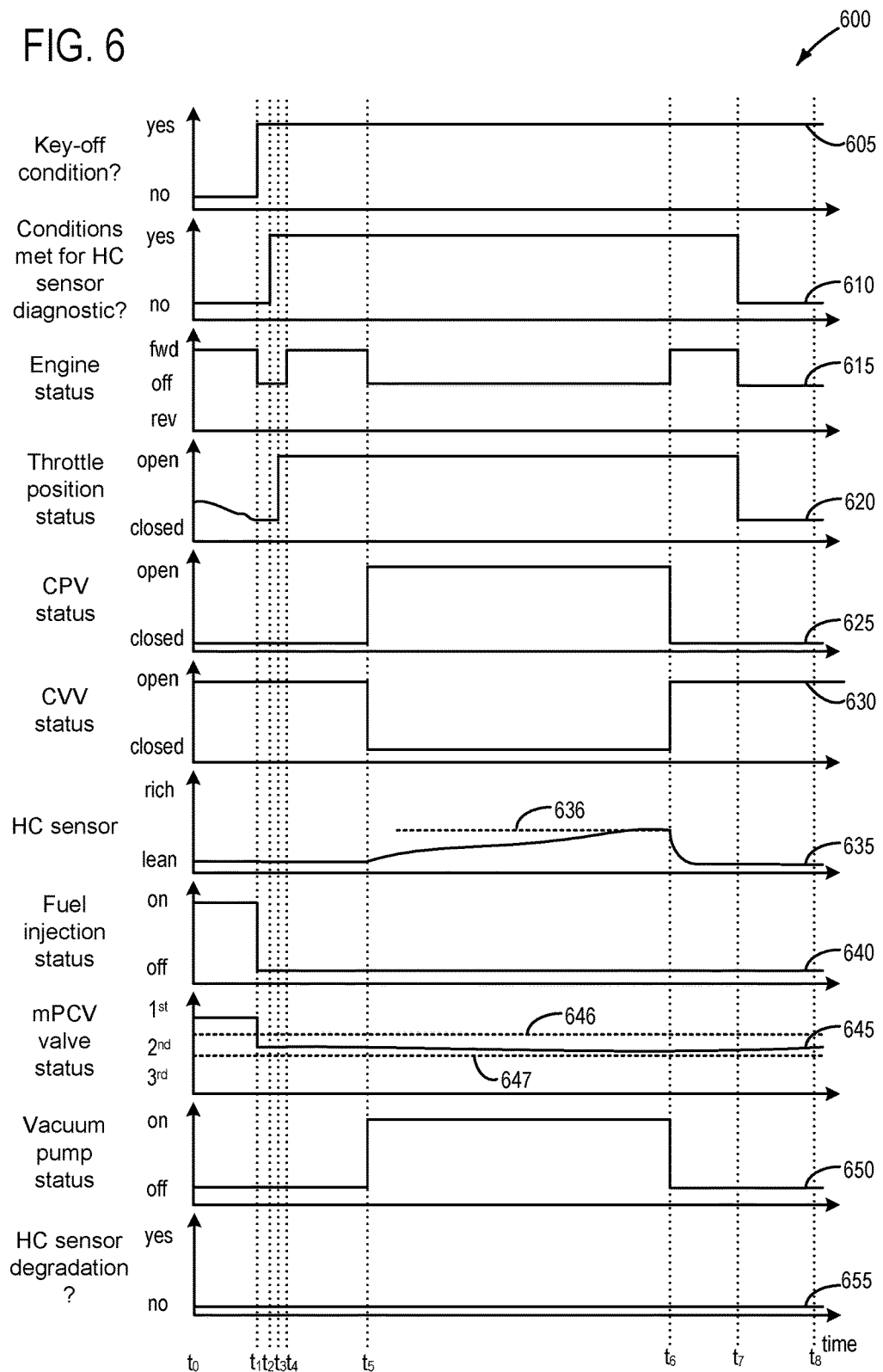

SYSTEMS AND METHODS FOR IMPROVING FUEL VAPOR CANISTER PURGING OPERATIONS IN A PHEV

FIELD

The present description relates generally to methods and systems for controlling a vehicle engine to rationalize a hydrocarbon sensor used for feedforward control of fuel vapor canister purging operations in plug-in hybrid electric vehicles.

BACKGROUND/SUMMARY

Automotive fuel, primarily gasoline, is a volatile liquid subject to potentially rapid evaporation, in response to diurnal variations in the ambient temperature. Thus, the fuel contained in automobile gas tanks presents a major source of potential evaporative emission of hydrocarbons into the atmosphere. Such emissions from a vehicle constitute what is technically called as 'evaporative emissions'.

Industry's response to this potential issue has been the incorporation of the evaporative emission control systems (EVAP) into automobiles, to prevent fuel vapor from being discharged into the atmosphere. The EVAP systems include a fuel vapor storage canister containing adsorbent carbon that traps those fuel vapors and feeds them back to the intake manifold of the engine of the vehicle for combustion during canister purging operations, thus, reducing evaporative emissions from the vehicle.

Hybrid electric vehicles, including plug-in hybrid electric vehicles (PHEV's), pose a particular problem for effectively controlling evaporative emissions with this kind of system. Although hybrid vehicles have been proposed and introduced having a number of forms, these designs share the characteristic of providing a combustion engine as backup to an electric motor. Primary power is provided by the electric motor, and careful attention to charging cycles can result in an operating profile in which the engine is only run for short periods. Systems in which the engine is only operated once or twice every few weeks are not uncommon. Purging the carbon canister can only occur when the engine is running, and if the canister is not purged, the carbon pellets can become saturated, after which hydrocarbons will escape to the atmosphere, causing pollution.

Further, PHEVs have a sealed fuel tank designed to withstand differences in pressure and vacuum within the tank resulting from diurnal ambient temperature variations. As the fuel tank for PHEVs are sealed, diurnal and running loss vapors are contained in the fuel tank, and the canister is loaded primarily under conditions when the fuel tank is unsealed in order to refuel the tank. Subsequent to the canister being loaded from a refueling event, the canister may be purged of the fuel vapors, by a controller of the engine commanding a purge event at the subsequent drive cycle. Once the canister is clean of fuel vapors, it may thus stay clean until the next refueling event, which may be a considerable length of time if electric-only operation is primarily used.

For purging operations, some strategies utilize a "feed-forward" control strategy to maintain a stoichiometric air/fuel ratio for engine combustion. Such strategies may rely on a hydrocarbon sensor placed in a purge line between the canister and the engine, to measure a concentration of the vapor being purged from the canister. Based on the concentration, an engine fueling strategy may be controlled to reduce fuel injector pulses in order to maintain a stoichiometric air/fuel ratio during the purging event, thus reducing a risk of engine hesitation and/or engine stall as a result of the purge event. Thus, it is desirable for engine control strategies that it be known as to whether the hydrocarbon sensor is functioning as desired.

While the hydrocarbon sensor may be rationalized during a purging event by simply, indicating whether the hydrocarbon sensor responds to the fuel vapors being purged from the canister, after the canister is clean, it may be challenging to diagnose the hydrocarbon sensor until a subsequent refueling event. As discussed above, a subsequent refueling event may not take place for an extended time period under conditions where the vehicle is operated in the electric-only mode of operation, and as such, the hydrocarbon sensor may experience a long duration without being rationalized. During such time, if the hydrocarbon sensor becomes degraded, then a subsequent purge event may result in engine hesitation/stall, which may negatively impact customer satisfaction and which may lead to engine degradation over time. Thus, a method to diagnose the hydrocarbon sensor used for feed-forward air/fuel ratio control during purging of a fuel vapor storage canister, is desired.

The inventors have herein recognized the above-mentioned issues, and have developed systems and methods to address them. In one example, a method comprises routing blow-by gasses from a crankcase of an engine of a vehicle to an intake manifold of the engine, and then to a fuel vapor storage canister positioned in an evaporative emissions system of the vehicle, and indicating whether a hydrocarbon sensor used for feed-forward air/fuel ratio control during purging of the fuel vapor storage canister is functioning as desired based on a response of the hydrocarbon sensor during the routing. In this way, such a hydrocarbon sensor may be rationalized under conditions where the fuel vapor storage canister is clean, and where the vehicle is frequently operated in an electric-only mode of operation.

In one example, routing blow-by gasses may include a key-off condition following a drive cycle where the engine was in operation to propel the vehicle. Routing blow-by gasses to the intake manifold may further include opening a positive crankcase valve positioned in a line that coupled the crankcase to the intake manifold. In one example, the positive crankcase valve may comprise an electronically actuatable valve under the control of a controller of the vehicle, and may be commanded fully open to route blow-by gasses to the intake manifold. In another example, the positive crankcase valve may comprise a passively mechanically actuatable valve, controlled to a least restrictive position, such that blow-by gasses may be routed to the intake manifold.

By rationalizing the hydrocarbon sensor as described above and which will be further elaborated upon below, adverse situations such as engine hesitation and/or stall may be reduced or avoided in response to purging operations, which may in turn increase engine lifetime and customer satisfaction.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 depicts a high-level example method for rationalizing a hydrocarbon sensor used for purge control of a fuel vapor canister positioned in the evaporative emissions system depicted at FIG. 1.

FIG. 6 depicts another example timeline for rationalizing the hydrocarbon sensor used for purge control, according to the method of FIG. 4

DETAILED DESCRIPTION

Figure 1:
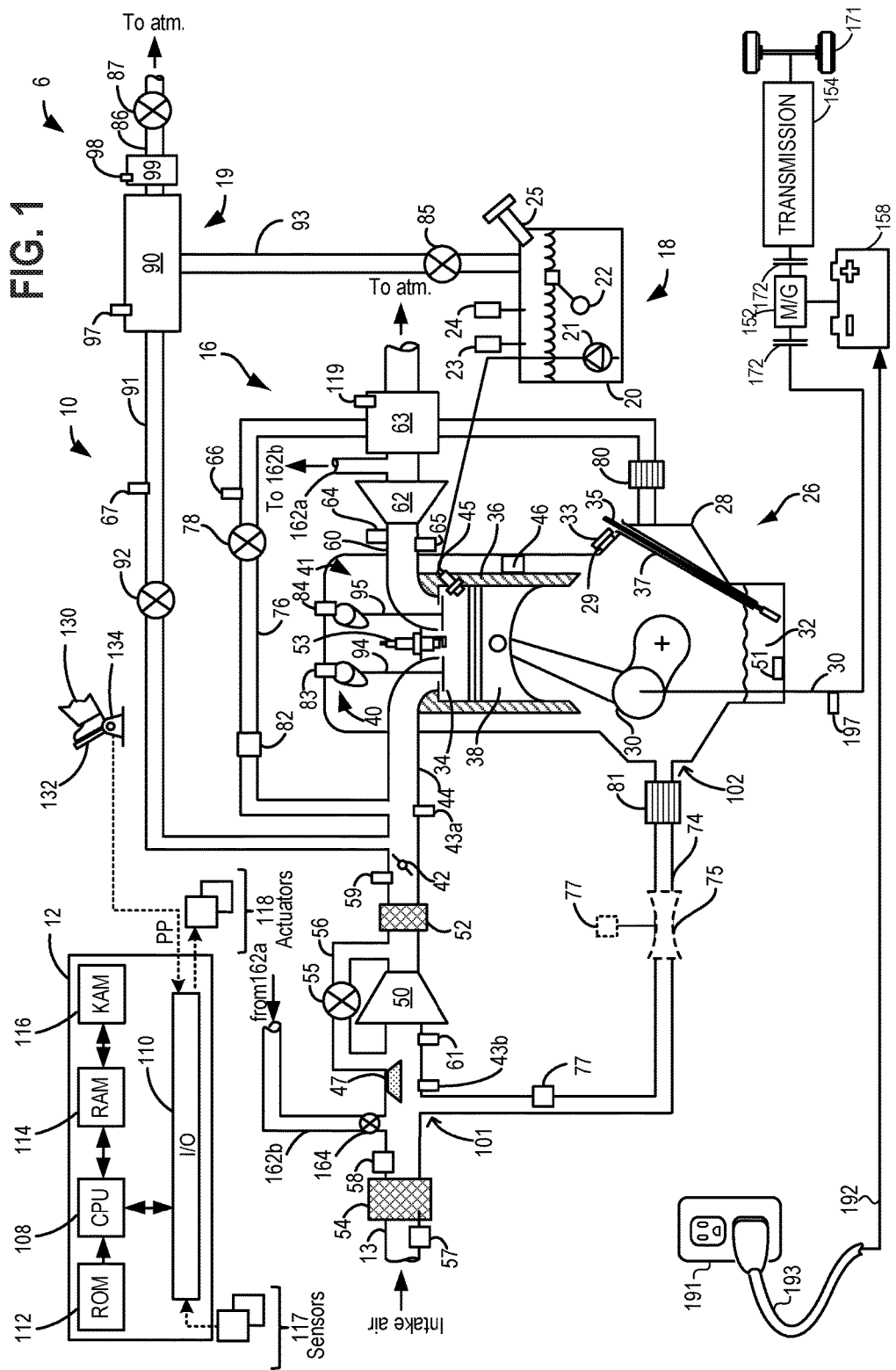
FIG. 1 shows a schematic description of an engine including an engine positive crankcase ventilation (PCV) system, a fuel system, and an evaporative emissions system.
Figure 2:
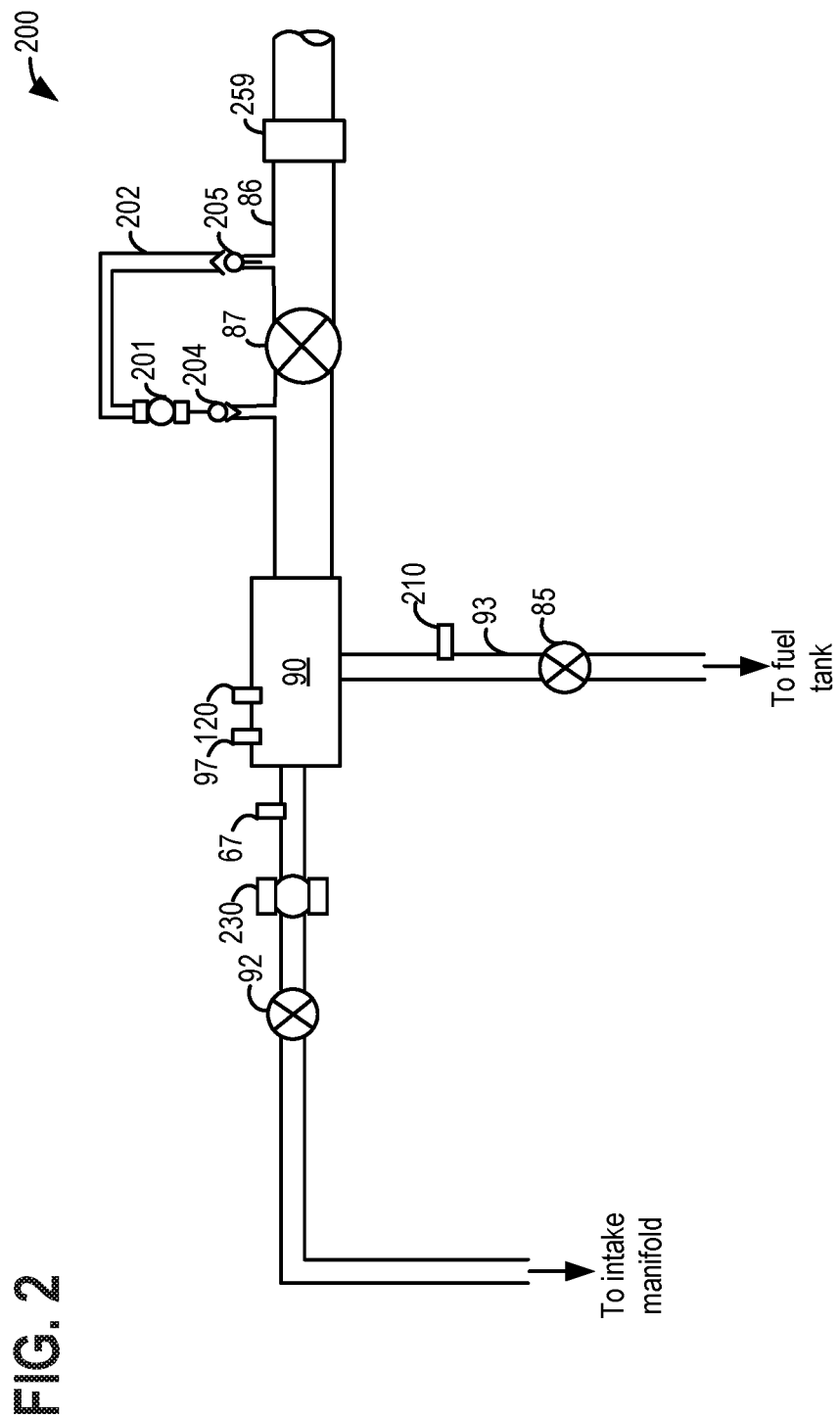
FIG. 2 shows a schematic description of another example of the evaporative emissions system depicted at FIG. 1.
Figure 3A:
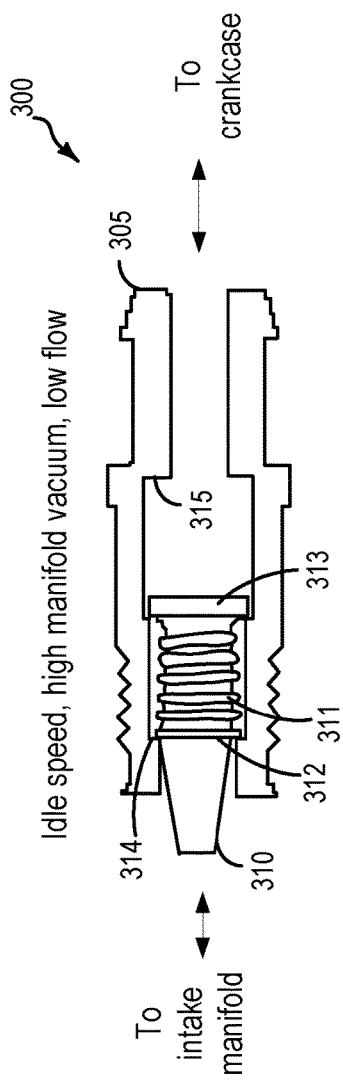
FIGS. 3A-3C depict example configurations of a mechanical PCV valve depending on pressure in an intake manifold of the engine depicted at FIG. 1.
Figure 3B:
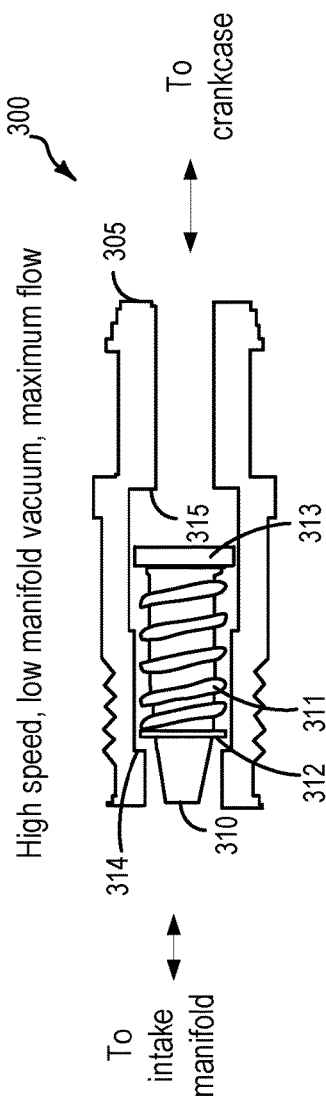
Figure 3C:
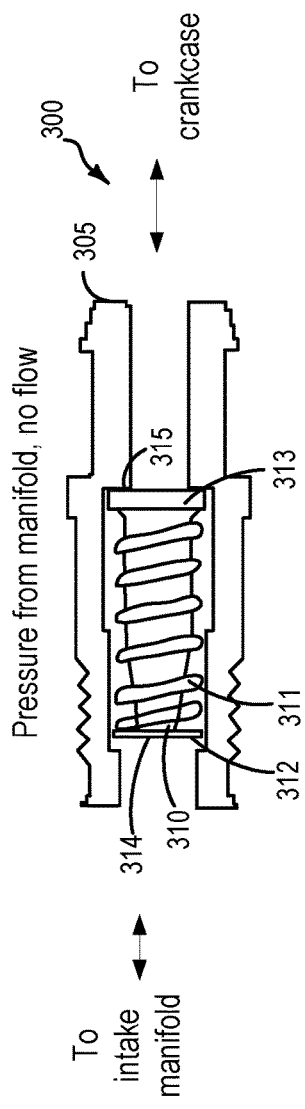
Figure 5:
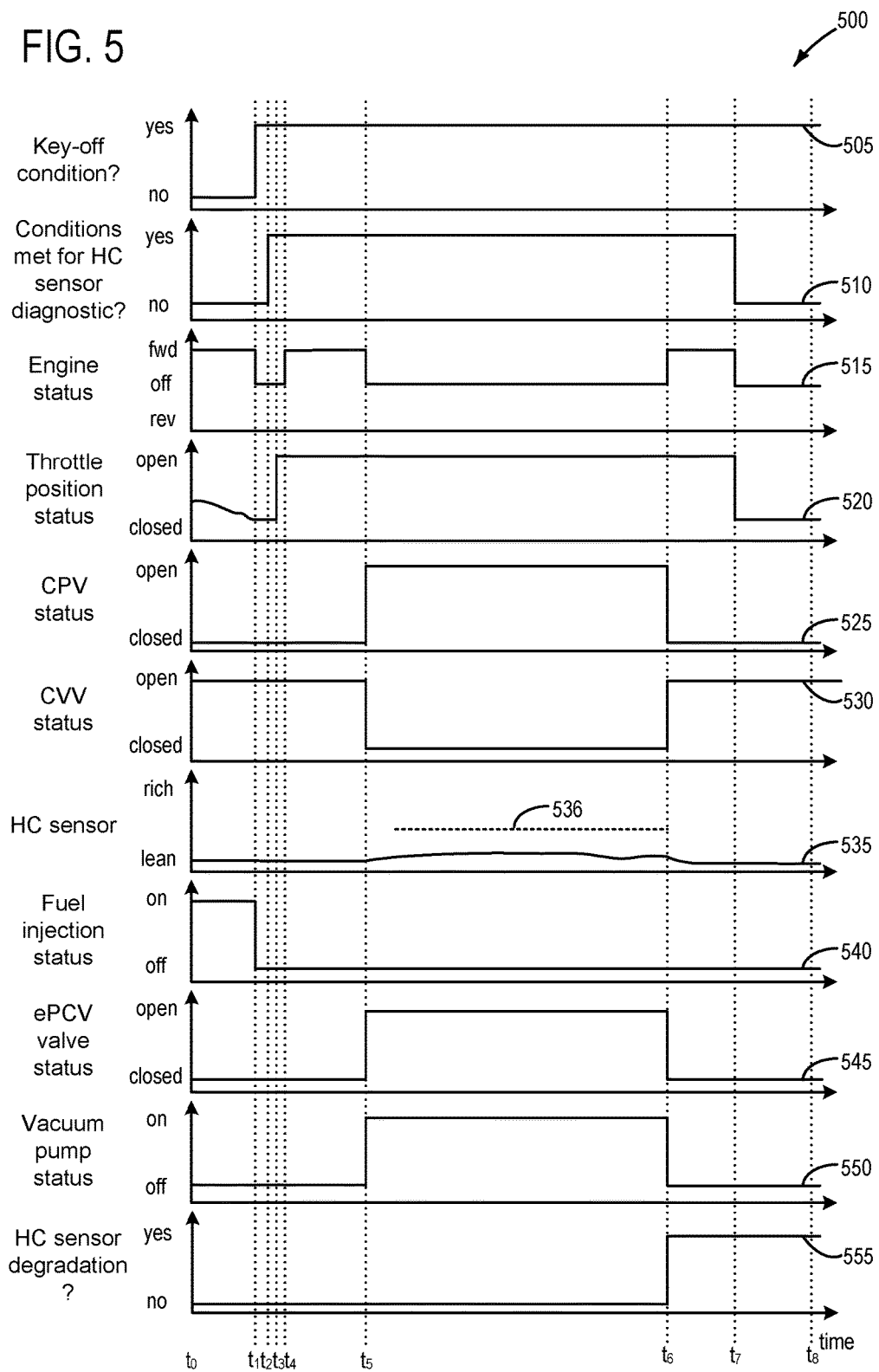
FIG. 5 depicts an example timeline for rationalizing the hydrocarbon sensor used for purge control according to the method of FIG. 4.

The following description relates to systems and methods for diagnosing a hydrocarbon sensor in plug-in hybrid electric vehicles (PHEVs) used for feed-forward air/fuel ratio control during purging of a fuel vapor storage canister. While the systems and methods focus on PHEVs, it may be understood that the methodology may be equally applicable to hybrid electric vehicles (HEVs) with sealed fuel tanks. Accordingly, FIG. 1 depicts an example engine system for a PHEV, including a fuel system, evaporative emissions system, positive crankcase ventilation (PCV) system, means for plugging into an electric grid, and a motor/generator. Briefly, diagnosing the hydrocarbon sensor may include routing blow-by gasses from a crankcase of the engine through the PCV system to an intake manifold of the engine, and then routing the blow-by gasses in the intake manifold to the evaporative emissions system for storage in a fuel vapor storage canister, where the routing directs the blow-by gasses past the hydrocarbon sensor, thus enabling rationalization of the hydrocarbon sensor. The routing of blow-by gasses to the canister may include activation of a vacuum pump positioned between the canister and atmosphere. In one example, the vacuum pump comprises an emissions level check monitor (ELCM) positioned in a vent line. In another example, depicted at FIG. 2, the vacuum pump may be positioned in a vacuum pump conduit that is parallel to the vent line. To route blow-by gasses from the crankcase to the intake manifold, a PCV valve positioned in the PCV system may be opened. The PCV valve may in some examples comprise a passively-actuated mechanical PCV valve (mPCV valve), whereas in other examples the PCV valve may comprise an electric (e.g. electronically-actuated) PCV valve (ePCV valve). Accordingly, FIGS. 3A-3C depict examples of how pressure in the intake manifold relates to open/closed states of the mPCV valve. FIG. 4 depicts an example method for rationalizing the hydrocarbon sensor. FIGS. 5-6 illustrate example timelines for rationalizing the hydrocarbon sensor according to the method of FIG. 4, where the time line of FIG. 5 includes use of the ePCV valve, and where the timeline of FIG. 6 includes use of the mPCV valve.

Turning now to FIG. 1, a schematic depiction of a hybrid vehicle system 6 is presented that can derive propulsion power from engine system 10 and/or an on-board energy storage device, such as a battery system (see below). An energy conversion device, such as a generator (see below), may be operated to absorb energy from vehicle motion and/or engine operation, and then convert the absorbed energy to an energy form suitable for storage by the energy storage device. Engine system 10 may comprise a multi-cylinder internal combustion engine, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil fill port 29 when the engine is in operation. A dip stick tube 37 may also be disposed in crankcase 28 and may include a dipstick 35 for measuring a level of oil in oil well 32. An oil temperature sensor 51 may be included in crankcase 28, and may monitor temperature of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 44 which is positioned downstream of throttle 42. The engine block 26 may also include an engine coolant temperature (ECT) sensor 46 input into an engine controller 12.

In some embodiments, each cylinder of engine 10 may include a spark plug 53 for initiating combustion. An ignition system (not shown) may provide an ignition spark to cylinder 34 via spark plug 53 in response to a spark advance signal from a controller, under select operating modes.

Throttle 42 may be disposed in the engine intake to control the airflow entering intake manifold 44 and may be preceded upstream by compressor 50 followed by charge air cooler 52, for example. Throttle 42 may comprise an electrically actuated throttle, for example. An air filter 54 may be positioned upstream of compressor 50 and may filter fresh air entering intake passage 13. The intake air may enter combustion chamber 34 via electrically-actuated intake valve system 40. Likewise, combusted exhaust gas may exit combustion chamber 34 via electrically-actuated exhaust valve system 41. In an alternate embodiment, one or more of the intake valve system and the exhaust valve system may be cam-actuated. Intake air may bypass compressor 50 via compressor bypass conduit 56, during conditions wherein compressor bypass valve (CBV) 55 is opened. In this way, pressure buildup at the compressor inlet may be relieved. Each cylinder of engine 10 may include one or more intake valves and one or more exhaust valves. For example, cylinder 34 is shown including at least one intake valve 94 and at least one exhaust valve 95 located at an upper region of cylinder 34. The valves of cylinder 34 may in some examples be deactivated via hydraulically actuated lifters coupled to valve pushrods, or via a cam profile switching mechanism in which a cam lobe with no lift is used for deactivated valves. Still other valve deactivation mechanisms may also be used, such as electrically actuated valves. In one example, engine 10 may comprise a variable displacement engine (VDE) where each cylinder of engine 10 may be selectively deactivatable, where deactivatable refers to the ability of the controller to command both intake and exhaust valves closed for particular cylinder(s), thus sealing the particular cylinders. If fuel injection is also stopped, then such action may result in the particular cylinder(s) being essentially an air-spring. Accordingly, as depicted herein, in one embodiment, deactivation of intake valve 94 may be controlled by first VDE actuator 83 while deactivation of exhaust valve 95 may be controlled by second VDE actuator 84. In alternate embodiments, a single VDE actuator may control deactivation of both intake and exhaust valves of the deactivatable cylinder. In still other embodiments, a single cylinder valve actuator deactivates a plurality of cylinders (both intake and exhaust valves), for example all the cylinders in the deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators. Cylinder 34 may have a compression ratio, which is the ratio of volumes when piston 38 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, a first intake air oxygen sensor 43a (first IAO2 sensor) may be positioned downstream of throttle 42. Furthermore, in some examples, an air intake system hydrocarbon (AIS HC) trap 47 may be positioned downstream of air filter 54, but upstream of compressor 50. Still further, in some examples, a second intake air oxygen sensor 43b (second IAO2 sensor) may be positioned upstream of the throttle 42. Second intake air oxygen sensor 43b may constitute an intake air oxygen sensor utilize for exhaust gas recirculation (EGR) purposes, for example, and may be used in vehicles in which fuel is injected directly, for example gasoline turbo direct injection (GTDI) engines.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Exhaust gas sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12. Engine exhaust 60 may further include one or more emission control devices 63 mounted in a close-coupled position. The one or more emission control devices may include a three-way catalyst, lean NOx trap, diesel particulate filter, oxidation catalyst, etc. In some examples, multiple exhaust gas sensors may be positioned both upstream and downstream of emission control device 63. In some examples, an electric heater 119 may be coupled to the emission control device(s), and may be under control of the controller. Such an electric heater may be utilized in some examples to raise temperature of the emission control device to a light-off temperature, or otherwise referred to as operating temperature.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or crankcase ventilation tube 74. A first side 101 of crankcase ventilation tube 74 may be mechanically coupled, or connected, to fresh air intake passage 13 upstream of compressor 50. In some examples, the first side 101 of crankcase ventilation tube 74 may be coupled to intake passage 13 downstream of air filter 54 (as shown). In other examples, the crankcase ventilation tube may be coupled to intake passage 13 upstream of air filter 54. A second, opposite side 102 of crankcase ventilation tube 74 may be mechanically coupled, or connected, to crankcase 28 via an oil separator 81.

Crankcase ventilation tube 74 further includes a sensor 77 coupled therein for providing an estimate about air flowing through crankcase ventilation tube 74 (e.g., flow rate, pressure, etc.). In some embodiments, crankcase vent tube sensor 77 may be a pressure sensor, referred to herein as a crankcase pressure sensor (CKCP sensor) 77. When configured as a pressure sensor, CKCP sensor 77 may be an absolute pressure sensor or a gauge sensor. In an alternate embodiment, sensor 77 may be a flow sensor or flow meter. In still another embodiment, sensor 77 may be configured as a venturi. In some embodiments, in addition to a pressure or flow sensor 77, the crankcase vent tube may optionally include a venturi 75 for sensing flow there-through. In still other embodiments, pressure sensor 77 may be coupled to a neck of venturi 75 to estimate a pressure drop across the venturi. One or more additional pressure and/or flow sensors may be coupled to the crankcase ventilation system at alternate locations. For example, a barometric pressure sensor (BP sensor) 57 may be coupled to intake passage 13, upstream of air filter 54, for providing an estimate of barometric pressure. In one example, where crankcase vent tube sensor 77 is configured as a gauge sensor, BP sensor 57 may be used in conjunction with gauge pressure sensor 77. In some embodiments, pressure sensor 61 may be coupled in intake passage 13 downstream of air filter 54 and upstream of compressor 50 to provide an estimate of the compressor inlet pressure (CIP). However, since crankcase vent tube pressure sensor 77 may provide an accurate estimate of a compressor inlet pressure during elevated engine air flow conditions (such as during engine run-up), the need for a dedicated CIP sensor may be reduced. Further still, a pressure sensor 59 may be coupled downstream of compressor 50 for providing an estimate of a throttle inlet pressure (TIP). Any of the above-mentioned pressure sensors may be absolute pressure sensor or gauge sensors.

PCV system 16 also vents gases out of the crankcase and into intake manifold 44 via a conduit 76 (herein also referred to as PCV line 76). In some examples, PCV line 76 may include a PCV valve 78, which may be an electronically controlled PCV valve that is controlled by controller 12. In another example, the PCV valve 78 may comprise a passively-actuatable mechanical valve. For example, the PCV valve may actively or passively vary its flow restriction in response to the pressure drop across it (or flow rate through it). Thus, in one example PCV valve 78 may be an electronically controlled valve wherein controller 12 may command a signal to change a position of the valve from a fully open position (or a position of high flow) to a fully closed position (or a position of no flow), or vice versa, or any position there-between. In another example, the PCV valve 78 may be passively actuated, discussed below at FIGS. 3A-3C.

The gases (referred to herein as blow-by gasses) in crankcase 28 may consist of un-burned fuel or un-combusted fuel, un-combusted fuel vapor, un-combusted air, and fully or partially combusted gases. Further, oil mist or vapor may also be present. As such, various oil separators may be incorporated in crankcase ventilation system 16 to reduce exiting of the oil mist from the crankcase through the PCV system. For example, PCV line 76 may include a uni-directional oil separator 80 which filters oil from vapors exiting crankcase 28 before they re-enter the intake manifold 44. Another oil separator 81 may be disposed in crankcase ventilation tube 74 to remove oil from the stream of gases exiting the crankcases during boosted operation. Additionally, PCV line 76 may also include a vacuum sensor 82 coupled to the PCV system. In other embodiments, a MAP or manifold vacuum (ManVac) sensor may be located in intake manifold 44.

Engine system 10 is coupled to a fuel system 18. Fuel system 18 includes a fuel tank 20 coupled to a fuel pump 21 and a fuel vapor canister 90. During a fuel tank refueling event, fuel may be pumped into the vehicle from an external source through refueling port 25. Fuel tank 20 may hold a plurality of fuel blends, including fuel with a range of alcohol concentrations, such as various gasoline-ethanol blends, including E10, E85, gasoline, etc., and combinations thereof. A fuel level sensor 22 located in fuel tank 20 may provide an indication of the fuel level ("Fuel Level Input") to controller 12. As depicted, fuel level sensor 22 may comprise a float connected to a variable resistor. Alternatively, other types of fuel level sensors may be used.

Fuel pump 21 is configured to pressurize fuel delivered to the injectors of engine 10, such as example injector 45. It will be appreciated that fuel system 18 may be a return-less fuel system, a return fuel system, or various other types of fuel system. Vapors generated in fuel tank 20 may be routed to fuel vapor storage canister 90 (also referred to herein as fuel vapor canister, or just canister), via conduit 93, before being purged to engine intake manifold 44.

Fuel vapor canister 90 (also referred to herein as fuel vapor storage canister, or simply, canister) may be positioned in evaporative emissions system 19. Fuel vapor canister 90 is filled with an appropriate adsorbent for temporarily trapping fuel vapors (including vaporized hydrocarbons) generated during fuel tank refueling operations. In one example, the adsorbent used is activated charcoal. When purging conditions are met, such as when the canister is saturated, vapors stored in fuel vapor canister 90 may be purged to engine intake passage 13 by opening canister purge valve (CPV) 92. While a single canister 90 is shown, it will be appreciated that evaporative emissions system 19 may include any number of canisters. In one example, CPV 92 may be a solenoid valve wherein opening or closing of the valve is performed via actuation of a canister purge valve solenoid.

A hydrocarbon sensor 67 may be positioned in purge line 91. By incorporating hydrocarbon sensor 67, purging of the canister 90 may be optimized while maintaining a stoichiometric air/fuel ratio for engine combustion. More specifically, hydrocarbon sensor 67 may enable feed-forward air/fuel ratio control of engine combustion during purging of a fuel vapor storage canister. For example, based on an indication of hydrocarbon concentration being purged from the canister, an engine fueling strategy may compensate fuel injection pulses in order to maintain a stoichiometric air/fuel ratio, which may prevent a risk of engine stall, hesitation, etc., from a rich mixture of air and fuel.

Hydrocarbon sensor 67 may comprise an adsorption sensitive resistor which may operate on a principle of adsorption according to Vander Walls "a" constant, where an electrical resistance of the hydrocarbon sensor 67 varies with respect to fuel vapor concentration present. Discussed herein, output of the hydrocarbon sensor may be a function of the electrical resistance of the hydrocarbon sensor. For example, an output for a particular resistance may comprise a particular concentration of fuel vapor sensed via the hydrocarbon sensor.

Canister 90 may include a buffer (or buffer region) (not shown), each of the canister and the buffer comprising adsorbent. The volume of the buffer may be smaller than (e.g., a fraction of) the volume of canister 90. Adsorbent in the buffer may be same as, or different from, the adsorbent in the canister (e.g., both may include charcoal). The buffer may be positioned within canister 90 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 90 includes a vent line 86 for routing gases out of the canister 90 to the atmosphere when storing, or trapping, fuel vapors from fuel tank 20. Vent line 86 may also allow fresh air to be drawn into fuel vapor canister 90 when purging stored fuel vapors to engine intake passage 13 via purge line 91 and CPV 92. While this example shows vent 86 communicating with fresh, unheated air, various modifications may also be used. Vent 86 may include a canister vent valve (CVV) 87 to adjust a flow of air and vapors between canister 90 and the atmosphere. The canister vent valve may also be used for diagnostic routines. When included, the vent valve may be opened during fuel vapor storing operations (for example, during fuel tank refueling) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 87 may be a solenoid valve wherein opening or closing of the valve is performed via actuation of a canister vent solenoid. In particular, the canister vent valve may be a default-open valve that is closed upon actuation of the canister vent solenoid. In some examples, an air filter (not shown) may be coupled in vent 86 between canister vent valve 87 and atmosphere.

Hybrid vehicle system 6 may have reduced engine operation times due to the vehicle being powered by engine system 10 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 85 may be included in conduit 93 such that fuel tank 20 is coupled to canister 90 via the valve. During regular engine operation, isolation valve 85 may be kept closed to limit the amount of diurnal or "running loss" vapors directed to canister 90 from fuel tank 20. During refueling operations, and selected purging conditions, isolation valve 85 may be temporarily opened, e.g., for a duration, to direct fuel vapors from the fuel tank 20 to canister 90. While the depicted example shows isolation valve 85 positioned along conduit 93, in alternate embodiments, the isolation valve may be mounted on fuel tank 20. The fuel system may be considered to be sealed when isolation valve 85 is closed.

One or more pressure sensors 23 may be coupled to fuel system 18 for providing an estimate of a fuel system pressure. In one example, the fuel system pressure is a fuel tank pressure, wherein pressure sensor 23 is a fuel tank pressure sensor coupled to fuel tank 20 for estimating a fuel tank pressure or vacuum level. While the depicted example shows pressure sensor 23 directly coupled to fuel tank 20, in alternate embodiments, the pressure sensor may be coupled between the fuel tank and canister 90, specifically between the fuel tank and isolation valve 85.

One or more temperature sensors 24 may also be coupled to fuel system 18 for providing an estimate of a fuel system temperature. In one example, the fuel system temperature is a fuel tank temperature, wherein temperature sensor 24 is a fuel tank temperature sensor coupled to fuel tank 20 for estimating a fuel tank temperature. While the depicted example shows temperature sensor 24 directly coupled to fuel tank 20, in alternate embodiments, the temperature sensor may be coupled between the fuel tank and FTIV 85. A canister temperature sensor 97 may be coupled to canister 90 and configured to indicate temperature changes of the adsorbent material within the canister. As fuel vapor adsorption is an exothermic reaction and fuel vapor desorption is an endothermic reaction, the canister temperature may be used to indicate a quantity of fuel vapor adsorbed during a venting event (e.g., during refueling and, which will be discussed further below, during a diagnostic to rationalize hydrocarbon sensor 67), and/or the quantity of fuel vapor desorbed during a purging operation.

Fuel vapors released from canister 90, for example during a purging operation, may be directed into engine intake manifold 44 via purge line 91. The flow of vapors along purge line 91 may be regulated by CPV 92, coupled between the fuel vapor canister and the engine intake. The quantity and rate of vapors released by the CPV may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. As discussed above, in some examples feed-forward air/fuel ratio control during purging of a fuel vapor storage canister may be utilized via the controller, based on a concentration of fuel vapors being directed to engine intake manifold 44, where the concentration of fuel vapors is measured via the hydrocarbon sensor 67.

By commanding the canister purge valve to be closed, the controller may seal the canister and evaporative emissions system from the engine intake.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 85 and CVV 87 while closing CPV 92 to direct refueling vapors into canister 90 while preventing fuel vapors from being directed into the intake manifold.

As another example, the fuel system may be operated in a refueling mode (e.g., when fuel tank refueling is requested by a vehicle operator), wherein the controller 12 may open isolation valve 85 and CVV 87, while maintaining CPV 92 closed, to depressurize the fuel tank before allowing fuel to be added therein. As such, isolation valve 85 may be kept open during the refueling operation to allow refueling vapors to be stored in the canister. After refueling is completed, the isolation valve may be closed.

As discussed, the fuel system may be operated in a canister purging mode (e.g., after an emission control device light-off temperature has been attained and with the engine running), wherein the controller 12 may open canister purge valve 92 and canister vent valve while closing isolation valve 85. Herein, the vacuum generated by the intake manifold of the operating engine may be used to draw fresh air through vent 86 and through fuel vapor canister 90 to purge the stored fuel vapors into intake manifold 44. In this mode, the purged fuel vapors from the canister are combusted in the engine. The purging may be continued until the stored fuel vapor amount in the canister is below a threshold. During purging, a learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. Such a vapor amount/concentration may be learned via the output of hydrocarbon sensor 67, in one example. Still further, in some examples the IAO2 sensor 43a may be utilized to learn the vapor amount/concentration.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors 117 coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; exhaust temperature sensor 65; crankcase vent tube pressure sensor 77, BP sensor 57, CIP sensor 61, TIP sensor 59, canister temperature sensor 97, hydrocarbon sensor 67, etc. Furthermore, controller 12 may monitor and adjust the position of various actuators 118 based on input received from the various sensors. These actuators may include, for example, throttle 42, intake and exhaust valve systems 40, 41, PCV valve 78, CPV 92, FTIV 85, CVV 87, etc. Storage medium read-only memory 112 can be programmed with computer readable data representing instructions executable by processor 108 for performing the methods described below, as well as other variants that are anticipated but not specifically listed.

Controller 12 may also be configured to intermittently perform undesired evaporative emission detection routines on fuel system 18 and/or evaporative emissions system 19.

Tests may be performed by an evaporative level check module (ELCM) 99 communicatively coupled to controller 12. ELCM 99 may be coupled in vent 86, between canister 90 and the atmosphere. ELCM 99 may include a vacuum pump for applying negative pressure to the fuel system and/or evaporative emission system when administering a test. In some embodiments, the vacuum pump may be configured to be reversible. In other words, the vacuum pump may be configured to apply either a negative pressure or a positive pressure on the fuel system and/or evaporative emissions system. ELCM 99 may further include a reference orifice and a pressure sensor 98. The reference orifice may enable a threshold pressure to be determined based on current ambient and operating conditions. Furthermore, while not explicitly illustrated, ELCM 99 may include a changeover valve that, when actuated via the controller to a first position, couples the ELCM to atmosphere, and when actuated to a second position, seals the ELCM from atmosphere. Thus, in some examples where the ELCM is included, the CVV may or may not be additionally included. Following the applying of vacuum to the fuel system and/or evaporative emissions system, a change in pressure at pressure sensor 98 (e.g., an absolute change or a rate of change) may be monitored and compared to the threshold pressure. Based on the comparison, the fuel system and/or evaporative emissions system may be diagnosed for a presence or absence of undesired evaporative emissions. As such, various diagnostic detection tests may be performed while the engine is off (engine-off test) or while the engine is running (engine-on test). Tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). Tests performed while the engine is not running may include sealing the fuel system following engine shut-off and monitoring a change in fuel tank pressure. This type of test is referred to herein as an engine-off natural vacuum test (EONV). In sealing the fuel system following engine shut-off, a vacuum may develop in the fuel tank as the tank cools and fuel vapors are condensed to liquid fuel. The amount of vacuum and/or the rate of vacuum development may be compared to expected values. In another example, at a vehicle-off event, as heat continues to be rejected from the engine into the fuel tank, the fuel tank pressure may initially rise. During conditions of relatively high ambient temperature, a pressure build above a threshold may be considered a passing test.

As discussed, hybrid vehicle system 6 may include multiple sources of torque available to one or more vehicle wheels 171, however, in other examples, the vehicle may include an engine without other sources of torque available. In the example shown, hybrid vehicle system 6 includes an electric machine 152. Electric machine 152 may be a motor or a motor/generator. Crankshaft 30 of engine 10 and electric machine 152 are connected via a transmission 154 to vehicle wheels 171 when one or more clutches 172 are engaged. In the depicted example, a first clutch is provided between crankshaft 30 and electric machine 152, and a second clutch is provided between electric machine 152 and transmission 154. Controller 12 may send a signal to an actuator of each clutch 172 to engage or disengage the clutch, so as to connect or disconnect crankshaft from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 158 (also described herein as onboard energy storage device, energy storage device, or battery) to provide torque to vehicle wheels 171. Electric machine 152 may also be operated as a generator to provide electrical power to charge traction battery 158, for example during a braking operation.

Onboard energy storage device 158 may periodically receive electrical energy from a power source 191 residing external to the vehicle (e.g., not part of the vehicle) as indicated by arrow 192. As a non-limiting example, hybrid vehicle system 6 may be configured as a PHEV, whereby electrical energy may be supplied to energy storage device 158 from power source 191 via an electrical energy transmission cable 193. During a recharging operation of energy storage device 158 from power source 191, electrical transmission cable 193 may electrically couple energy storage device 158 and power source 191. While the vehicle propulsion system is operated to propel the vehicle, electrical transmission cable 193 may disconnected between power source 191 and energy storage device 158. Controller 12 may identify and/or control the amount of electrical energy stored at the energy storage device, which may be referred to as the state of charge (SOC).

In other examples, electrical transmission cable 193 may be omitted, where electrical energy may be received wirelessly at energy storage device 158 from power source 191. For example, energy storage device 158 may receive electrical energy from power source 191 via one or more of electromagnetic induction, radio waves, and electromagnetic resonance. As such, it may be appreciated that any suitable approach may be used for recharging energy storage device 158 from a power source that does not comprise part of the vehicle.

Hybrid vehicle system 6 may include an exhaust gas recirculation (EGR) system. Specifically, the EGR system may include one or more of high pressure EGR, or low pressure EGR. In the example illustration depicted at FIG. 1, a low pressure EGR system is illustrated. Specifically, an EGR passage is indicated, the EGR passage comprising passage 162*a* and 162*b*. It may be understood that passage 162*a* and 162*b* may comprise the same EGR passage, but is indicated as a broken passage for clarity. The EGR passage comprising passage 162*a* and 162*b* may further include EGR valve 164. By controlling timing of opening and closing of EGR valve 164, an amount of exhaust gas recirculation may be appropriately regulated.

While the example illustration of FIG. 1 includes an ELCM, it is herein recognized that the use of such an ELCM may increase costs during manufacturing, which may be desirable to avoid. Thus, turning to FIG. 2, an illustration 200 of a partial depiction of hybrid vehicle system 6, is shown. Such a vehicle system may include a vacuum pump 201, configured in a vacuum pump conduit 202. The vacuum pump may comprise a rotary vane pump, a diaphragm pump, a liquid ring pump, a piston pump, a scroll pump, a screw pump, a wankel pump, etc., and may be understood to be in parallel with the CVV 87. The vacuum pump conduit 202 may be configured to route fluid flow (e.g. air and fuel vapors) from vent line 86, around canister vent valve 87. Vacuum pump conduit 202 may include a first check valve (CV1) 204, and second check valve (CV2) 205. When the vacuum pump 201 is activated, air may be drawn from vent line 86 between canister 90 and CVV 87, through vacuum pump conduit 202, back to vent line 86 at a position between canister vent valve 87 and atmosphere. In other words, the vacuum pump may be activated to evacuate the fuel system provided that FTIV 85 is commanded open via the controller. CV1 204 may comprise a pressure/vacuum-actuated valve that may open responsive to activating the vacuum pump to evacuate the fuel system, and which may close responsive to the vacuum pump 201 being deactivated, or turned off. Similarly, CV2 may comprise a pressure/vacuum-actuated valve. When the vacuum pump 201 is activated to evacuate the fuel system, CV2 205 may open to allow fluid flow to be routed from vacuum pump conduit 202 to atmosphere, and which may close responsive to the vacuum pump 201 being turned off. It may be understood that CVV 87 may be commanded closed in order to evacuate the fuel system (and/or evaporative emissions system) via the vacuum pump 201. Similarly, as will be discussed in detail below, in examples where a diagnostic routine is conducted to rationalize the hydrocarbon sensor 67, the vacuum pump 201 may be utilized to draw a vacuum (e.g. negative pressure with respect to atmospheric pressure) on the intake manifold. In doing so, the CPV may be commanded open, the CVV may be commanded closed, the FTIV may be commanded closed, and the vacuum pump 201 may be commanded on to evacuate the intake manifold, as will be discussed in detail at FIG. 4.

As discussed above, the ELCM may include a reference orifice that may enable a determination of a vacuum level that, if achieved when evacuating the fuel system and/or evaporative emissions system, is indicative of an absence of undesired evaporative emissions. However, in the example depicted at FIG. 2, where the ELCM is not included but where the vacuum pump 201 is included, there may not be a reference orifice. Thus, additional calibrations may be utilized in order to determine vacuum thresholds for indicating a presence or absence of undesired evaporative emissions. For example, there may be a 3D lookup table stored at the controller, which may enable determination of thresholds as a function of ambient temperature and fuel level. In this way, the reference orifice may not be included, which may reduce costs associated with including an ELCM.

Furthermore, as discussed, the ELCM may include a pressure sensor. In the example depicted at FIG. 2, a pressure sensor 210 is included, positioned in conduit 93. Thus, it may be understood that FTIV 85 may be bounded by a fuel tank pressure sensor (e.g. 23) (fuel tank pressure transducer) and pressure sensor 210 positioned in conduit 93 between FTIV 85 and canister 90. In this way, under conditions where the FTIV 85 is closed, pressure sensor 210 may monitor pressure in the evaporative emissions system (e.g. 19), and pressure sensor 23 may monitor pressure in the fuel system (e.g. 18).

Thus, by employing the vacuum pump 201 in vacuum pump conduit 202, including CV1 204 and CV2 205, along with pressure sensor 210, manufacturing costs associated with including a means for evacuating the fuel system and evaporative emissions system during engine-off conditions (and for evacuating the intake manifold to conduct a diagnostic on hydrocarbon sensor positioned between the canister and the CPV), may be reduced.

As discussed, CVV 87 may function to adjust a flow of air and vapors between canister 90 and the atmosphere, and may be controlled during or prior to diagnostic routines. For example, the CVV may be opened during fuel vapor storing operations (for example, during fuel tank refueling) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In example illustration 200, the configuration of the vacuum pump 201 positioned in vacuum pump conduit 202 may allow for purging operations and refueling operations to be conducted without an undesirable additional restriction (the pump 201, and check valves CV1 204, CV2 205). In other words, during purging and refueling operations, the CVV may be commanded open, where flow of fluid through vacuum pump conduit 202 may be prevented via the check valves (CV1, CV2) and with the vacuum pump 201 deactivated.

As discussed, engine manifold vacuum may be used to purge the canister. However, in some examples, there may not be sufficient intake manifold vacuum to effectively purge the canister. For example, vacuum is a pumping loss and engine systems may be configured to reduce such vacuum. Accordingly, in some examples, a purge pump 230 may be positioned between the canister purge valve 92 and canister 90, to facilitate purging of the canister under conditions of low intake manifold vacuum. When activated, for example via the controller sending a signal to an actuator of the purge pump, the purge pump 230 may draw a vacuum on the canister in order to draw fuel vapors from the canister and route them to engine intake for combustion. With the purge pump activated, it may be understood that the CVV may be commanded open to facilitate purging of the canister.

As mentioned above, feed-forward air/fuel ratio control (via a hydrocarbon sensor coupled to a purge line between the canister and the intake manifold) of engine combustion during a purging operation may enable a concentration of fuel vapor introduced to the engine during a purging operation to be learned, such that fuel injector pulses may be controlled in order to control engine air/fuel ratio and avoid potential engine stall or hesitation. Accordingly, it may be desirable to ensure that the hydrocarbon sensor (e.g. 67) positioned between the canister (e.g. 90) and the CPV (e.g. 92) is functioning as desired, otherwise any compensatory strategy may not correctly adjust fuel injection pulses to maintain a stoichiometric air/fuel ratio. One example for rationalizing the purge control hydrocarbon sensor may include simply indicating whether the hydrocarbon sensor responds to an output level greater than a threshold output level during a purging operation where the canister is known to include stored fuel vapor, where the output level/threshold output level corresponds to electrical resistance of the hydrocarbon sensor as a function of fuel vapor concentration present. However, for PHEVs which may operate in an electric-only mode, following a purge event the canister may remain clean for an extended duration of time under conditions where the vehicle is operated in the electric-only mode. More specifically, a refueling event may load the canister with fuel vapor, and subsequently engine control strategies may request a purge event to clean the canister. In doing so, the hydrocarbon sensor may be rationalized. However, subsequent to the purge, the vehicle may be operated for many days in the electric-only mode of operation, with the fuel tank sealed from the evaporative emissions system. Thus, there may be prolonged periods where no fuel vapors are introduced into the evaporative emissions system, and thus the hydrocarbon sensor may go undiagnosed during such time periods. If, during the course of such a situation, the hydrocarbon sensor becomes degraded, a later refueling operation followed by a purging of the canister may result in engine hesitation and/or stall due to the concentration of fuel vapor inferred to be routed to the engine being incorrectly estimated via the controller.

Thus, a diagnostic that enables the hydrocarbon sensor to be rationalized under conditions where the canister is clean, is desirable. Accordingly, discussed below at FIG. 4 is an example method for conducting a hydrocarbon sensor diagnostic. Briefly, the diagnostic may include, at a key-off event with the fuel system sealed (e.g. FTIV closed), spinning the engine unfueled (and without spark) in a forward direction (e.g. the same direction the engine spins as when combusting air and fuel) with the PCV valve at least partially open and the throttle open, to direct blow-by gasses in the crankcase to the intake manifold. Further, the CPV may then be commanded open and the vacuum pump (e.g. 201 or 99), or in other examples the purge pump (e.g. 230), may be activated to draw a vacuum (negative pressure with respect to atmospheric pressure) on the intake manifold. The vacuum may thus draw the blow-by gasses to the canister, passing over the hydrocarbon sensor. In this way, responsive to the hydrocarbon sensor responding to a level (e.g. output level) greater than a predetermined HC sensor threshold level (also referred to herein as a threshold output level, or threshold output) with the vacuum pump activated, it may be indicated that the hydrocarbon sensor is functioning as desired. In some examples, the engine may be continued to be spun unfueled while drawing the vacuum on the intake manifold, whereas in other examples the engine may be stopped from spinning unfueled after a predetermined duration of engine spinning, the predetermined duration coinciding with the activation of the vacuum pump (or purge pump). The predetermined duration of engine spinning may comprise a duration of time where it is expected or inferred that the blow-by gasses have reached the intake manifold in sufficient quantity, the sufficient quantity referring to a quantity expected to result in a hydrocarbon sensor response greater than the predetermined HC sensor threshold level if the HC sensor is functioning as desired.

Such a method may include, in one example, an ability to electronically command open the PCV valve (e.g. ePCV valve) via the controller, in one example. In another example where the vehicle includes a passively actuated mechanical PCV valve (e.g. mPCV valve), the method may be conducted with control of the PCV valve being a function of at least intake manifold pressure. Accordingly, a mechanical PCV valve will be described below with regard to FIGS. 3A-3C.

Turning now to FIGS. 3A-3C, example illustrations of various conformations of a passive PCV valve (e.g. 78) during various conditions, is shown. More specifically, FIG. 3A illustrates a PCV valve 300 (e.g. 78) conformation during idle speed, high intake manifold vacuum conditions. FIG. 3B illustrates a conformation of PCV valve 300 (e.g. 78) during high speed, low intake manifold conditions. FIG. 3C illustrates a conformation of PCV valve 300 (e.g. 78) during conditions of positive pressure with respect to atmospheric pressure in the intake manifold. It may be understood that PCV valve 300 depicted at FIGS. 3A-3C may comprise the same PCV valve as PCV valve 78 depicted above at FIG. 1.

While the description of the valve is in relation to vehicle operating conditions (e.g. idle speed, high speed), it may be understood that while the vehicle is in a key-off state the passive PCV valve may adopt the indicated conformations by controlling pressure in the intake manifold to the indicated levels depicted at FIGS. 3A-3C. Such control will be discussed below with regard to the methodology depicted at FIG. 4.

Turning to FIG. 3A, PCV valve 300 may include a PCV valve housing 305, a plunger 310, and a spring 311. Furthermore, PCV valve 300 may include a first pintle 312, and a second pintle 313. Responsive to conditions of idle speed and high intake manifold vacuum, the high intake manifold vacuum may draw the plunger 310 toward the intake manifold, resulting in the first pintle 312 seating against a first valve seat 314. As such, under high intake manifold vacuum conditions, PCV valve 300 adopts a low flow conformation. In other words, fluid flow from the crankcase may be prevented as a result of the first pintle 312 seating against the first valve seat 314.

Turning to FIG. 3B, PCV valve 300 is illustrated under conditions of high engine speed, and low intake manifold vacuum. Responsive to conditions of high engine speed, and low intake manifold vacuum, spring 311 may push first pintle 312 away from first valve seat 314, thus allowing more fluid flow. Furthermore, second pintle 313 may not contact second valve seat 315, and as such, a high engine speed, low intake manifold vacuum condition may represent a condition where fluid flow through PCV valve 300 is the least restricted.

While the above-described condition for the least restricted fluid flow discusses high engine speed, it may be understood that in some examples, engine speed may not be necessarily high, for example under key-off conditions where the throttle (e.g. 42) is commanded open (e.g. fully open), as will be discussed in further detail below. In other words, pressure in the intake manifold may be manipulated via controlling the throttle to an open position, which may thus influence the conformation that the PCV valve adopts (e.g. least restrictive conformation under low manifold vacuum conditions).

Turning to FIG. 3C, PCV valve 300 is illustrated under conditions of positive intake manifold pressure. Under such conditions, PCV valve 300 may close. More specifically, positive pressure in the intake manifold may result in second pintle 313 seating against second valve seat 315, thus preventing fluid flow from the intake manifold to the crankcase.

Thus, the PCV valve may occupy different configurations as a function of intake manifold pressure. As such, by actively controlling pressure in the intake manifold, the PCV may be controlled to a least restricted, or open position. Such control may be useful for a diagnostic routine that includes routing fluid flow comprising blow-by gasses from the crankcase to the intake manifold, in order to rationalize the hydrocarbon sensor (e.g. 67), as will be discussed in detail below.

Thus, the systems described above with regard to FIGS. 1-3C may enable a system for a hybrid electric vehicle, comprising an engine including an intake, an intake manifold, and an exhaust system. Such a system may further include a throttle positioned in the intake. Such a system may further include a positive crankcase ventilation system including a positive crankcase ventilation valve positioned in a positive crankcase ventilation line, for selectively fluidically coupling a crankcase of the engine to the intake manifold. Such a system may further include a motor, and an evaporative emissions system including a fuel vapor storage canister, the fuel vapor storage canister selectively fluidically coupled to atmosphere via a canister vent valve positioned in a vent line. Such a system may further include a vacuum pump positioned in a vacuum pump conduit in parallel with the vent line. Such a system may further include a first check valve positioned in the vacuum pump conduit between the vacuum pump and the vent line downstream of the canister vent valve. Such a system may further include a second check valve positioned in the vacuum pump conduit between the vacuum pump and the vent line upstream of the canister vent valve. Such a system may further include a canister purge valve, positioned in a purge line, the canister purge valve selectively fluidically coupling the intake manifold to the fuel vapor storage canister. Such a system may further include a hydrocarbon sensor positioned in the purge line between the fuel vapor storage canister and the canister purge valve. Such a system may further include a controller storing instructions in non-transitory memory that, when executed, cause the controller to, at a key-off event where a canister loading state of the fuel vapor storage canister is below a threshold canister loading state and where a drive cycle just prior to the key-off event included engine operation, conduct the following sequence of steps. The throttle may be commanded open, and the canister vent may be commanded closed. The motor may be operated to rotate the engine unfueled to route blow-by gasses in the crankcase to the intake manifold via the positive crankcase ventilation valve in an at least partially open position. The vacuum pump may then be activated to draw the blow-by gasses past the hydrocarbon sensor via the canister purge valve commanded to an open position, and it may be indicated as to whether the hydrocarbon sensor is degraded responsive to an output of the hydrocarbon sensor below a threshold output, while drawing the blow-by gasses past the hydrocarbon sensor.

In one example of such a system, the positive crankcase valve may be an electronically actuatable positive crankcase valve, and the controller may store further instructions to command the positive crankcase valve to a fully open position in order to route blow-by gasses in the crankcase to the intake manifold.

In another example of such a system, the positive crankcase valve may be a passively-actuated mechanical positive crankcase ventilation valve, and the controller may store further instructions to manipulate pressure in the intake manifold to control the passively-actuated mechanical positive crankcase ventilation valve to a least-restrictive position in order to route blow-by gasses in the crankcase to the intake manifold.

Turning now to FIG. 4, a high-level flowchart for an example method 400 for conducting a purge control hydrocarbon sensor diagnostic, is shown. More specifically, method 400 may be utilized at a key-off condition where the fuel vapor storage canister is clean, and where conditions are otherwise met for conducting such a diagnostic. Method 400 will be described with reference to the systems described herein and shown in FIGS. 1-3C, though it will be appreciated that similar methods may be applied to other systems without departing from the scope of this disclosure. Instructions for carrying out method 400 and the rest of the methods included herein may be executed by a controller, such as controller 12 of FIG. 1, based on instructions stored in non-transitory memory, and in conjunction with signals received from sensors of the engine system, such as temperature sensors, pressure sensors, and other sensors described in FIGS. 1-3C. The controller may employ actuators such as motor/generator (e.g. 152), throttle (e.g. 42), fuel injector(s) (e.g. 45), PCV valve (e.g. 78), vacuum pump (e.g. 99 or 201), CPV (e.g. 92), etc., according to the methods described herein.

Method 400 begins at 405, and may include evaluating current vehicle operating conditions. Operating conditions may be estimated, measured, and/or inferred, and may include one or more vehicle conditions, such as vehicle speed, battery state of charge, etc., various engine conditions, such as engine status (on or off), engine load, engine temperature, engine speed, torque demand, exhaust air-fuel ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 410, method 400 may include indicating whether a key-off event is detected. In other words, at 410 it may be indicated if a key-off event occurs following a drive cycle. If not, method 400 may proceed to 415. At 415, method 400 may include maintaining current vehicle operating conditions, which may include maintaining engine operation if the engine is being used to propel the vehicle, maintaining electric operation of the vehicle if the vehicle is being propelled electrically, or maintaining some combination of engine operating and electrical operation if both are being utilized to propel the vehicle. Other operating conditions may be maintained as well. Method 400 may then end.

Returning to 410, responsive to a key-off event being indicated, method 400 may proceed to 420. At 420, method 400 may include indicating whether conditions are met for rationalizing the purge control hydrocarbon sensor (e.g. 67). In one example, conditions being met may include an indication that the canister is clean (e.g. canister load below a canister load threshold, the canister load threshold comprising less than 5% loaded, for example). Conditions being met may further include an indication that a temperature of engine oil is greater than a threshold temperature, as monitored via, for example, the oil temperature sensor (e.g. 51). Conditions being met may additionally or alternatively include an indication that a heat rejection index (HRI) for the previous drive cycle is greater than a threshold. The HRI may be based on an amount of heat rejected by the engine during the previous drive cycle, the timing of the heat rejected, the length of time spent at differing levels of drive aggressiveness, ambient conditions, etc. The heat rejected by the engine may be based on one or more of engine load, fuel injected summed over time, and/or intake manifold air mass summed over time, miles driven, etc. For example, the HRI above the threshold may make it likely that the crankcase includes blow-by gasses, which may be utilized to rationalize the hydrocarbon sensor. As an example, in a situation where the vehicle was driven in electric-only mode prior to the key-off event, the crankcase may not have sufficient blow-by gasses to conduct the hydrocarbon sensor diagnostic.

Conditions being met at 410 may in some examples include an indication that a predetermined duration of time has elapsed since it was last determined whether the hydrocarbon sensor is functioning as desired. Conditions being met may in some examples further include an indication the PCV system is not degraded, that the evaporative emissions system is not degraded, etc.

If, at 420, conditions are not indicated to be met for conducting the hydrocarbon sensor diagnostic, method 400 may proceed to 415, and may include maintaining current vehicle conditions, which may additionally include sleeping the controller of the vehicle responsive to the key-off event. Method 400 may then end.

Returning to 420, responsive to conditions being indicated to be met for conducting the hydrocarbon sensor diagnostic, method 400 may proceed to 425. At 425, method 400 may include maintaining the controller in an awake state, such that the diagnostic may be conducted. Proceeding to 430, method 400 may include commanding the intake throttle fully open. More specifically, the throttle may be electronically actuated, via a command from the controller, to the fully open position.

Proceeding to 435, method 400 may include spinning the engine unfueled, via the motor (e.g. 152). More specifically, the controller may send a signal to the motor, commanding it to rotate the engine in a forward direction, without providing fuel injection or spark. The engine may be spun at a predetermined engine speed (e.g. predetermined RPM, for example 500 RPM). It may be understood that, spinning the engine unfueled may result in a vacuum in the intake manifold, however with the throttle open the vacuum motive force in the intake manifold as a result of spinning the engine unfueled may be reduced substantially. This may allow for the engine to be spun without concern that an undesirable vacuum build may develop in the intake manifold.

Furthermore, in a case where the PCV valve is mechanical, the low intake manifold vacuum may result in the PCV valve adopting the least restricted configuration. While spinning the engine may result in a positive pressure being directed to the PCV valve from the crankcase (which, as will be discussed below may result in crankcase blow-by gasses being routed through the PCV valve and to the intake manifold), the positive pressure may not be substantial enough to result in the PCV valve adopting the closed configuration depicted at FIG. 3A. In other words, where the PCV valve is mechanical, commanding the throttle fully open may reduce the intake manifold vacuum to a point where the least restrictive position of the valve is adopted (FIG. 3B), and although spinning the engine may route blow-by gasses to the PCV valve (thus resulting in a positive pressure build at the PCV valve), the routing of the blow-by gasses may not force closed the PCV valve. In some examples, engine speed may be controlled to ensure that the PCV valve is not forced closed due to the positive pressure build. As one example, a pressure sensor (e.g. 66) may be positioned in the PCV system in close proximity to the PCV valve, and may be utilized to monitor any pressure build that develops at the PCV valve, such that engine speed may be controlled to avoid closing the PCV valve.

Thus, in a case where the PCV valve is mechanical, it may be understood that by commanding open the throttle, and controlling a speed at which the engine is spun unfueled, the PCV valve may adopt the least-restrictive position, which may thus result in crankcase blow-by gasses being routed to the intake manifold.

Alternatively, in a case where the PCV valve is an electronic PCV valve, after spinning the engine for a predetermined duration (e.g. a few seconds), the ePCV valve may be commanded open via the controller. More specifically, the controller may send a signal to the ePCV valve, commanding it a fully open position. With the ePCV valve commanded fully open, blow-by gasses may be routed from the crankcase to the intake manifold.

Whether the PCV valve is mechanical or electronically controlled, method 400 may proceed to 440, and may include commanding open the CPV, and activating the vacuum pump (e.g. 201 or 99) to draw a negative pressure with respect to atmospheric pressure on the intake manifold. As discussed, in an example, at 440, the engine may be deactivated, or in other words stopped from spinning unfueled. However, in other examples, the engine may be continued to be spun unfueled at 440. In an example where the engine is continued to be spun unfueled, it may be understood that a speed of the engine may be controlled such that vapors are preferentially routed to the canister via the activation of the vacuum pump (or in some examples the purge pump). In other words, speed of the engine may be controlled such that the vacuum pull of the engine on the intake manifold is less than the vacuum pull on the intake manifold from the vacuum pump or purge pump. It may be understood that, by commanding open the CPV and activating the vacuum pump, the blow-by gasses in the intake manifold may be routed past the hydrocarbon sensor, to the fuel vapor canister, where they may be captured and stored.

In a case where the PCV valve comprises a mechanical PCV valve, it may be understood that the evacuation of the intake manifold via the vacuum pump may result in the closing of the PCV valve (see FIG. 3A). However, if there are already sufficient blow-by gasses in the intake manifold as a result of the spinning the engine unfueled, then the gasses in the intake manifold may be routed past the hydrocarbon sensor which may enable a determination as to whether the hydrocarbon sensor is functioning as desired, even if the evacuation closes the mechanical PCV valve. In such a case where it is expected that actuating the vacuum pump on to draw negative pressure on the intake manifold may result in the closing of the mechanical PCV valve, then the engine may be commanded via the controller to stop being rotated unfueled, concurrent with the activation of the vacuum pump. However, in another example, as discussed, an amount of negative pressure in the intake manifold resulting from the vacuum pump may be monitored, and the vacuum pump controlled, to maintain the negative pressure above (closer to atmospheric pressure) a negative pressure threshold, where the negative pressure threshold may comprise a level of vacuum where, if intake manifold pressure is above (e.g. less negative, closer to atmospheric pressure), then the PCV valve may be in the least restrictive position (FIG. 3B), while if intake manifold pressure is below (e.g. more negative, farther from atmospheric pressure), then the PCV valve may be in the closed position (FIG. 3A). Thus, the vacuum pump may be controlled via the controller to maintain enough negative pressure on the intake manifold to route the blow-by gasses past the hydrocarbon sensor to the fuel vapor canister, but where the negative pressure is not sufficient to close the mechanical PCV valve. In such a case, the blow-by gasses may be continued to be routed from the crankcase to the intake manifold via the PCV valve, while the vacuum pump is activated. In such an example, the engine may be continued to be spun while the vacuum pump is actuated on.

Alternatively, in a case where the PCV valve is electronically controllable, upon activation of the vacuum pump, the ePCV may be maintained open, and the engine may be maintained being spun unfueled in one example, or may be stopped from spinning unfueled in another example.

Whether the strategy used is based on the PCV valve being mechanical, or is based on the PCV valve being electrically controllable, method 400 may proceed to 445. At 445, method 400 may include indicating whether a hydrocarbon sensor response, or output, is greater than the predetermined HC sensor threshold, or threshold output. If not, method 400 may proceed to 450, and may include indicating whether a predetermined duration of time has elapsed since the vacuum pump was actuated on. The predetermined duration at 450 may comprise a duration of time where, if the hydrocarbon sensor were functioning as desired, then it may be expected that the HC sensor would have responded to a level greater than the predetermined HC sensor threshold. If, at 450, the predetermined duration has not elapsed, method 400 may return to 445, where the HC sensor response may be continued to be monitored.

Alternatively, at 450, responsive to the predetermined duration elapsing, method 400 may proceed to 455. At 455, method 400 may include indicating degradation of the hydrocarbon sensor. Proceeding to 460, method 400 may include storing the results of the test at the controller. A malfunction indicator light (MIL) may be illuminated at the vehicle, dash, alerting the vehicle operator of a request to service the engine and in particular the hydrocarbon sensor. Furthermore, at 460, vehicle operating conditions may be updated as a result of the indicated degradation.

Updating vehicle operating conditions at 460 responsive to the indicated degradation may include updating a canister purge schedule such that the canister is only purged under conditions that may not adversely impact engine operation. For example, after a refueling event, the vehicle controller may identify situations where purging of the canister is not expected to result in adverse engine operation (e.g. stall or hesitations), and purging may be initiated under such conditions. One example may comprise a deceleration fuel shut off (DFSO) event where, even if an unknown concentration of fuel vapors are inducted into the engine during a purge, as the engine is not combusting air and fuel, no adverse operation may result. In another example, the canister may be scheduled to be purged at a key-off event where an exhaust catalyst is still hot (e.g. above a light-off temperature), where the purging may be conducted via spinning the engine unfueled and commanding open the CPV and CVV, which may direct fuel vapors stored in the canister to the hot exhaust catalyst.

Proceeding to 465, method 400 may include commanding closed the CPV, and, under conditions where the vehicle included an ePCV, the ePCV may be commanded via the controller to a fully closed position. Furthermore, the vacuum pump may be deactivated, and the throttle may be maintained open at 465.

Proceeding to 470, method 400 may include purging any gasses in the intake manifold to the exhaust, where the exhaust catalyst is expected to still be hot (e.g. above the light-off temperature), as a result of the drive cycle just prior to the key-off event. Purging gasses to the exhaust may include, in a case where the engine is spinning unfueled, maintaining the engine spinning unfueled. Alternatively, in a case where the engine is off, purging gasses from the intake manifold to the exhaust may include commanding the engine to be spun unfueled in the forward direction. After a predetermined duration of spinning the engine unfueled, the engine may be commanded to be deactivated, or commanded to an off state. Furthermore, upon deactivating the engine at 470, the throttle may be returned to the position it was in prior to conducting the HC sensor diagnostic.

Proceeding to 475, method 400 may include sleeping the controller. Method 400 may then end.

Returning to 445, responsive to the HC sensor response being greater than the predetermined HC sensor threshold, method 400 may proceed to 480. At 480, method 400 may include indicating that the hydrocarbon sensor is functioning as desired. Proceeding to 460, method 400, may include storing the results at the controller, and updating vehicle operating conditions to reflect the passing result. Updating vehicle operating conditions in response to the indication of the absence of degradation of the hydrocarbon sensor may include maintaining engine operating conditions, electric motor operating conditions, purging schedules, etc., in their current operational status.

Proceeding to 465, method 400 may include commanding closed the CPV, and commanding closed the ePCV under conditions where the ePCV was commanded open.

Furthermore, at 465, the vacuum pump may be deactivated.

Continuing to 470, method 400 may include purging the intake manifold to the exhaust catalyst and returning the throttle to its position prior to conducting the diagnostic as described above, then sleeping the controller at 475. Method 400 may then end.

Thus, based on the above description, a method may comprise routing blow-by gasses from a crankcase of an engine of a vehicle to an intake manifold of the engine, and then to a fuel vapor storage canister positioned in an evaporative emissions system of the vehicle, and indicating whether a hydrocarbon sensor used for feed-forward air/fuel ratio control during purging of the fuel vapor storage canister is functioning as desired based on a response of the hydrocarbon sensor during the routing. Routing of the blow-by gasses may include a key-off condition following a drive cycle where the engine was in operation (e.g. combusting air and fuel) to propel the vehicle.

In an example of such a method, routing blow-by gasses to the intake manifold may include opening a positive crankcase valve positioned in a line that couples the crankcase to the intake manifold. As one example, the positive crankcase valve may comprise an electronically actuatable valve, and the positive crankcase valve may be electronically actuated to a fully open position to route blow-by gasses to the intake manifold. However, in another example, the positive crankcase valve may comprise a passively mechanically actuated valve, and in such a case the positive crankcase valve may be controlled to a least-restrictive position to route blow-by gasses to the intake manifold.

Such a method may further comprise commanding fully open a throttle positioned in an intake of the engine, where the throttle is electronically actuatable, to route blow-by gasses from the crankcase to the intake manifold and then to the fuel vapor storage canister.

In one example of the method, routing blow-by gasses from the crankcase to the intake manifold and then to the fuel vapor storage canister may further comprise actuating on a vacuum pump positioned between the fuel vapor storage canister and atmosphere, to draw a negative pressure with respect to atmospheric pressure on the intake manifold. In such an example, the vacuum pump may be positioned in a vent line between the fuel vapor storage canister and atmosphere. However, in another example, the vacuum pump may be positioned in a vacuum pump conduit in parallel with the vent line, rather than in the vent line.

In such a method, indicating whether the hydrocarbon sensor is functioning as desired may include indicating the hydrocarbon sensor is degraded responsive to an output of the hydrocarbon sensor below a threshold output during the routing blow-by gasses from the crankcase to the intake manifold and then to the fuel vapor storage canister.

Furthermore, in such a method, routing blow-by gasses from the intake manifold to the fuel vapor storage canister may include fluidically coupling the intake manifold to the fuel vapor storage canister, and may further comprise rotating the engine unfueled and without spark.

Still further, in such a method, routing blow-by gasses from the crankcase to the intake manifold and then to the fuel vapor storage canister may further comprise an indication that a load of the fuel vapor storage canister is below a threshold canister load.

Another example of a method may comprise conducting a diagnostic for a hydrocarbon sensor coupled to a purge line positioned between an intake manifold of an engine and a fuel vapor storage canister positioned in an evaporative emissions system of a vehicle driven by the engine. Such a diagnostic may be conducted via rotating the engine unfueled at a key-off event to direct blow-by gasses from a crankcase of the engine to the intake manifold, and then routing the blow-by gasses through the purge line past the hydrocarbon sensor en route to the fuel vapor storage canister. In this way, the hydrocarbon sensor may be indicated to be degraded responsive to a hydrocarbon sensor response to the blow-by gasses less than a threshold hydrocarbon sensor response during the routing the blow-by gasses past the hydrocarbon sensor. In such a method, conducting the diagnostic may further comprise an indication that a loading state of the fuel vapor storage canister is below a threshold canister loading state.

In such a method, directing blow-by gasses from the crankcase to the intake manifold may include fluidically coupling the crankcase to the intake manifold.

In such a method, routing the blow-by gasses through the purge line past the hydrocarbon sensor may include activating a vacuum pump positioned between the fuel vapor storage canister and atmosphere, or a purge pump positioned between the fuel vapor storage canister and the intake manifold, to draw a negative pressure with respect to atmospheric pressure on the intake manifold. Routing the blow-by gasses past the hydrocarbon sensor may further comprise fluidically coupling the intake manifold to the fuel vapor storage canister.

Such a method may further comprise controlling pressure in the intake manifold while conducting the diagnostic, where controlling pressure in the intake manifold includes controlling a position of a throttle positioned in an intake of the engine.

Turning now to FIG. 5, an example timeline 500 for conducting a hydrocarbon sensor diagnostic, according to the method of FIG. 4, is shown. Example timeline 500 includes plot 505, indicating whether a key-off condition is indicated, or not, over time. Timeline 500 further includes plot 510, indicating whether conditions are indicated to be met for conducting the hydrocarbon sensor diagnostic, over time. Timeline 500 further includes plot 515, indicating engine status, over time. The engine may either be off, rotating in a forward direction, or rotating in a reverse direction, over time. Timeline 500 further includes plot 520, indicating a position of an intake throttle (e.g. 42), over time. Timeline 500 further includes plot 525, indicating a status of the CPV, and plot 530, indicating a status of the CVV, over time. Timeline 500 further includes plot 535, indicating an output of the hydrocarbon sensor (e.g. 67), over time. The output may indicate a more rich (e.g. greater) amount of vapors/gasses detected via the hydrocarbon sensor, or a less rich, or leaner amount of vapors/gasses detected via the hydrocarbon sensor. Line 536 represents the predetermined HC sensor threshold or threshold output, where, if reached or exceeded during the hydrocarbon sensor diagnostic, is indicative of the hydrocarbon sensor not being degraded, or in other words, functioning as desired. Timeline 500 further includes plot 540, indicating a status of fuel injection to cylinders of the engine, over time. Timeline 500 further includes plot 545, indicating a status of the ePCV (e.g. 78), over time. Timeline 500 further includes plot 550, indicating a status of the vacuum pump (e.g. 201), over time. Timeline 500 further includes plot 555, indicating whether degradation of the hydrocarbon sensor is indicated, or not, over time.

It may be understood that, for example timeline 500, the vehicle system includes an electronically actuatable PCV valve, or ePCV valve, rather than a mechanical PCV valve. Furthermore, the vehicle system includes the vacuum pump (e.g. 210) depicted at FIG. 2, as opposed to the ELCM, depicted at FIG. 1.

At time t0, the vehicle is in operation, with the engine rotating in the forward direction (plot 515), and with fuel injection (plot 540) provided to the engine. While not explicitly illustrated, it may be understood that at time t0, spark is also provided to the engine. Accordingly, it may be understood that the engine is combusting air and fuel at time t0. As such, a key-off event is not indicated (plot 505), conditions are not indicated to be met for conducting the HC sensor diagnostic (plot 510), the CPV is closed (plot 525), the CVV is open (plot 530), the ePCV valve is closed (plot 545), and the vacuum pump is off (plot 550). As the CPV is closed and the engine is in operation, there are no gasses flowing past the hydrocarbon sensor, and thus a lean output is indicated (plot 535). The throttle position (plot 520) is a function of driver demand, and no degradation of the hydrocarbon sensor is indicated (plot 555).

Between time t0 and t1, the throttle becomes more closed, indicative of a vehicle operator releasing an accelerator pedal. At time t1, a key-off event is indicated, and accordingly, the engine is turned off, or deactivated. Deactivation of the engine includes stopping providing fuel injection, and further includes stopping providing spark. Responsive to the key-off event, the controller may determine whether conditions are indicated to be met for conducting the hydrocarbon sensor diagnostic, as discussed in detail above with regard to step 420 of method 400.

At time t2, conditions are indicated to be met for conducting the hydrocarbon sensor diagnostic (plot 510). Thus, at time t3 the throttle is commanded to a fully open position, via the controller. At time t4, the engine is activated to rotate unfueled in the forward direction, via the motor (e.g. 152). With the engine rotating unfueled, crankcase gasses may be directed from the crankcase in the direction of the ePCV valve and intake manifold (via the PCV line, e.g. 76). Accordingly, at time t5, after a short duration (e.g. 1-2 seconds), the ePCV valve is commanded open (plot 545). By commanding open the ePCV valve, the gasses directed toward the intake manifold as a result of spinning the engine may pass through the ePCV valve, en route to the intake manifold. Furthermore, at time t5, the CPV is commanded open, thus fluidically coupling the intake manifold to the hydrocarbon sensor and to the fuel vapor canister. Additionally, the CVV is commanded closed and the vacuum pump actuated on. More specifically, the CVV is commanded closed to enable the vacuum pump to draw a negative pressure on the intake manifold, via the open CPV. In this example, the engine is stopped from spinning unfueled at time t4.

With the vacuum pump actuated, the ePCV valve open, the CPV and throttle open, the CVV closed, it may be understood that the vacuum pump may draw blow-by gasses that have been routed to the intake manifold from the crankcase to the fuel vapor canister, past the hydrocarbon sensor.

Accordingly, between time t5 and t6, output of the hydrocarbon sensor is monitored via the controller, in order to indicate whether the response of the hydrocarbon sensor reaches or exceeds the predetermined HC sensor threshold represented by line 536. However, between time t5 and t6, the output of the hydrocarbon sensor indicates a leaner condition than the predetermined HC sensor threshold. In other words, the HC sensor does not respond as expected between time t5 and t6, if the hydrocarbon sensor were functioning as desired.

Thus, at time t6, hydrocarbon sensor degradation is indicated (plot 555). The result is stored at the controller, and in some examples a MIL may be illuminated at the vehicle dash, alerting the vehicle operator of a request to service the vehicle to address the degraded hydrocarbon sensor.

With hydrocarbon sensor degradation indicated at time t6, the vacuum pump is deactivated, the ePCV valve is commanded closed, the CPV is commanded closed, and the CVV is commanded open. The engine is activated to be spun unfueled, in order to purge any gasses in the intake manifold to the exhaust catalyst, the exhaust catalyst being above a light-off temperature as a result of the drive cycle ending at the key-off event. Thus, between time t6 and t7, the controller maintains the engine being spun unfueled for a predetermined duration, the predetermined duration comprising an amount of time where it is expected that any gasses present in the intake manifold may be routed to the exhaust catalyst. In other examples, an intake oxygen sensor may be used to monitor concentration of gasses in the intake manifold, where the engine may be spun unfueled until the concentration of gasses is below a threshold concentration.

At time t7, conditions are no longer indicated to be met for conducting the hydrocarbon sensor diagnostic, as the results of the test have been stored at the controller. Accordingly, the engine is stopped from rotating unfueled via the controller commanding the motor to stop rotating the engine unfueled, and the throttle is returned to the position it was at prior to commencing the diagnostic. While not explicitly illustrated, just after time t7, after returning the throttle to its original position and stopping rotating the engine, the controller may be put to sleep. Between time t7 and t8, the vehicle is maintained in the-key off state.

While timeline 500 depicts an example where the PCV valve is electronically actuatable, as discussed with regard to method 400 depicted above, it may in some examples be possible to conduct the diagnostic under conditions where the vehicle includes a mechanical PCV valve (mPCV valve). Accordingly, turning to FIG. 6, another example timeline 600 is shown, illustrating how the hydrocarbon sensor diagnostic may be conducted in such a situation. Timeline 600 is identical to the timeline depicted at FIG. 5, and thus, for brevity, only the differences between timeline 500 and timeline 600 will be emphasized. Specifically, a difference between time 500 and timeline 600 is that, instead of the ePCV valve (plot 545), timeline 600 includes the mPCV valve. The mPCV valve may be in a first closed position, represented by FIG. 3A, may be in an open or least-restricted second position, represented by FIG. 3B, or may be in a third closed position, represented by FIG. 3C. Dashed lines 646 and 647 are included in order to separate the first position from the second position and the second position from the third position.

Briefly, between time t0 and t1, the mPCV valve adopts the first position while the engine is operating to combust air and fuel, indicating an intake manifold vacuum condition great enough to close the mPCV valve such that it adopts the first conformation (FIG. 3A). At time t1, the engine is stopped, and accordingly, pressure in the intake manifold becomes such that the mPCV valve adopts the second, or least restrictive position. With conditions met for conducting the diagnostic at time t2, the throttle is commanded open at time t3, and the engine is controlled via the motor to rotate unfueled in the forward direction at time t4. However, even with the engine rotating, the mPCV valve is maintained in the least restrictive second position, as with the throttle open there is not sufficient vacuum in the intake manifold to result in the mPCV valve adopting the first configuration, and furthermore, the positive pressure that may be directed to the mPCV valve via spinning the engine unfueled to route the blow-by gasses from the crankcase to the intake manifold is not sufficient to force the mPCV valve to adopt the first configuration. In this way, the crankcase blow-by gasses may be routed to the intake manifold via the mPCV valve being in the second position.

At time t5, the vacuum pump is activated (along with opening the CPV and closing the CVV), and, while not explicitly illustrated, may in some examples be controlled to draw an amount of vacuum on the intake manifold sufficient to route the blow-by gasses to the canister, but where the mPCV valve is maintained in its least restrictive second position. Furthermore, in this example timeline, the engine is stopped from spinning in the forward direction unfueled at time t5. Accordingly, between time t5 and t6, the mPCV valve is maintained in the second position, and the output of the hydrocarbon sensor is monitored. Between time t5 and t6, the output of the hydrocarbon sensor reaches the predetermined HC sensor threshold (line 636), thus degradation of the hydrocarbon sensor is not indicated (plot 655). The test results are stored at the controller.

With the test results obtained, the vacuum pump is deactivated (plot 650), the CPV is closed (plot 625), and the CVV is opened (plot 630). The engine is reactivated to spin unfueled in the forward direction between time t6 and t7, to route any gasses in the intake manifold to the exhaust catalyst. At time t7, conditions are no longer met for conducting the diagnostic (plot 610), and accordingly, the engine is stopped from spinning unfueled (plot 615), and the throttle is returned to its original position prior to the diagnostic. Between time t7 and t8, the vehicle is maintained in the key-off state.

In this way, a hydrocarbon sensor used for feed-forward air/fuel ratio control during purging of a fuel vapor storage canister, may be diagnosed as to whether it is functioning as desired even under conditions where the canister is clean. By diagnosing the hydrocarbon sensor under such conditions, situations where a purge event may result in engine hesitation or stall, or air/fuel error and possible exhaust emissions, due to a degraded hydrocarbon sensor, may be reduced or avoided. The ability to diagnose the hydrocarbon sensor under such conditions where the canister is clean may be particularly advantageous for hybrid vehicles with limited engine run time, and a fuel tank that is sealed except for refueling events and other diagnostics.

The technical effect is to recognize that, under conditions where the canister is clean, it may be advantageous to diagnose the hydrocarbon sensor, and to do so in a manner that does not release fuel vapor/oil vapor to atmosphere. Thus, a technical effect is to recognize that, after a drive cycle where the engine was utilized and where the canister is clean, by spinning the engine unfueled with the PCV valve open, blow-by gasses from the crankcase may be directed to the intake manifold, and from there the gasses may be routed to the canister for storage via activation of the vacuum pump positioned between the canister and atmosphere. During the routing of gasses to the canister, the gasses pass by the hydrocarbon sensor, enabling rationalization of the sensor. In this way, the hydrocarbon sensor may be rationalized without introducing undesired emissions to atmosphere, and under conditions where the canister is clean. By rationalizing the hydrocarbon sensor under such conditions, engine operation may be improved, and engine lifetime may be increased. In turn, customer satisfaction may be improved.

The systems described herein, and with reference to FIGS. 1-3C, along with the methods described herein, and with reference to FIG. 4, may enable one or more systems and one or more methods. In one example, a method comprises routing blow-by gasses from a crankcase of an engine of a vehicle to an intake manifold of the engine, and then to a fuel vapor storage canister positioned in an evaporative emissions system of the vehicle; and indicating whether a hydrocarbon sensor used for feed-forward air/fuel ratio control during purging of the fuel vapor storage canister is functioning as desired based on a response of the hydrocarbon sensor during the routing. In a first example of the method, the method may further include wherein routing blow-by gasses includes a key-off condition following a drive cycle where the engine was in operation to propel the vehicle. A second example of the method optionally includes the first example, and further includes wherein routing blow-by gasses to the intake manifold includes opening a positive crankcase valve positioned in a line that couples the crankcase to the intake manifold. A third example of the method optionally includes any one or more or each of the first through second examples, and further includes wherein the positive crankcase valve is electronically actuatable, and wherein the positive crankcase valve is electronically actuated to a fully open position to route blow-by gasses to the intake manifold. A fourth example of the method optionally includes any one or more or each of the first through third examples, and further includes wherein the positive crankcase valve is passively mechanically actuated, and wherein the positive crankcase valve is controlled to a least-restrictive position to route blow-by gasses to the intake manifold. A fifth example of the method optionally includes any one or more or each of the first through fourth examples, and further comprises commanding fully open a throttle positioned in an intake of the engine, where the throttle is electronically actuatable, to route blow-by gasses from the crankcase to the intake manifold and then to the fuel vapor storage canister. A sixth example of the method optionally includes any one or more or each of the first through fifth examples, and further includes wherein routing blow-by gasses from the crankcase to the intake manifold and then to the fuel vapor storage canister further comprises actuating on a vacuum pump positioned between the fuel vapor storage canister and atmosphere, to draw a negative pressure with respect to atmospheric pressure on the intake manifold. A seventh example of the method optionally includes any one or more or each of the first through sixth examples, and further includes wherein the vacuum pump is positioned in a vent line between the fuel vapor storage canister and atmosphere. An eighth example of the method optionally includes any one or more or each of the first through seventh examples, and further includes wherein the vacuum pump is positioned in a vacuum pump conduit in parallel with the vent line, rather than in the vent line. A ninth example of the method optionally includes any one or more or each of the first through eighth examples, and further includes wherein indicating whether the hydrocarbon sensor is functioning as desired includes indicating the hydrocarbon sensor is degraded responsive to an output of the hydrocarbon sensor below a threshold output during the routing blow-by gasses from the crankcase to the intake manifold and then to the fuel vapor storage canister. A tenth example of the method optionally includes any one or more or each of the first through ninth examples, and further includes wherein routing blow-by gasses from the intake manifold to the fuel vapor storage canister includes fluidically coupling the intake manifold to the fuel vapor storage canister, and further comprises rotating the engine unfueled and without spark. An eleventh example of the method optionally includes any one or more or each of the first through tenth examples, and further includes wherein the routing blow-by gasses from the crankcase to the intake manifold and then to the fuel vapor storage canister further comprises an indication that a load of the fuel vapor storage canister is below a threshold canister load.

Another example of a method comprises conducting a diagnostic for a hydrocarbon sensor coupled to a purge line positioned between an intake manifold of an engine and a fuel vapor storage canister positioned in an evaporative emissions system of a vehicle driven by the engine, by rotating the engine unfueled at a key-off event to direct blow-by gasses from a crankcase of the engine to the intake manifold, and then routing the blow-by gasses through the purge line past the hydrocarbon sensor en route to the fuel vapor storage canister, where the hydrocarbon sensor is indicated to be degraded responsive to a hydrocarbon sensor response to the blow-by gasses less than a threshold hydrocarbon sensor response during the routing the blow-by gasses past the hydrocarbon sensor. In a first example of the method, the method further includes wherein conducting the diagnostic further comprises an indication that a loading state of the fuel vapor storage canister is below a threshold canister loading state. A second example of the method optionally includes the first example, and further includes wherein directing blow-by gasses from the crankcase to the intake manifold includes fluidically coupling the crankcase to the intake manifold. A third example of the method optionally includes any one or more or each of the first through second examples, and further includes wherein routing the blow-by gasses through the purge line past the hydrocarbon sensor includes activating a vacuum pump positioned between the fuel vapor storage canister and atmosphere, or a purge pump positioned between the fuel vapor storage canister and the intake manifold, to draw a negative pressure with respect to atmospheric pressure on the intake manifold; and wherein routing the blow-by gasses past the hydrocarbon sensor further comprises fluidically coupling the intake manifold to the fuel vapor storage canister. A fourth example of the method optionally includes any one or more or each of the first through third examples, and further comprises controlling pressure in the intake manifold while conducting the diagnostic, where controlling pressure in the intake manifold includes controlling a position of a throttle positioned in an intake of the engine.

A system for a hybrid electric vehicle comprises an engine including an intake, an intake manifold, and an exhaust system; a throttle positioned in the intake; a positive crankcase ventilation system including a positive crankcase ventilation valve positioned in a positive crankcase ventilation line, for selectively fluidically coupling a crankcase of the engine to the intake manifold; a motor; an evaporative emissions system including a fuel vapor storage canister, the fuel vapor storage canister selectively fluidically coupled to atmosphere via a canister vent valve positioned in a vent line; a vacuum pump positioned in a vacuum pump conduit in parallel with the vent line; a first check valve positioned in the vacuum pump conduit between the vacuum pump and the vent line downstream of the canister vent valve; a second check valve positioned in the vacuum pump conduit between the vacuum pump and the vent line upstream of the canister vent valve; a canister purge valve, positioned in a purge line, the canister purge valve selectively fluidically coupling the intake manifold to the fuel vapor storage canister; a hydrocarbon sensor positioned in the purge line between the fuel vapor storage canister and the canister purge valve; and a controller storing instructions in non-transitory memory that, when executed, cause the controller to: at a key-off event where a canister loading state of the fuel vapor storage canister is below a threshold canister loading state and where a drive cycle just prior to the key-off event included engine operation: command open the throttle and command closed the canister vent valve; operate the motor to rotate the engine unfueled to route blow-by gasses in the crankcase to the intake manifold via the positive crankcase ventilation valve in an at least partially open position, and further operating the vacuum pump to draw the blow-by gasses past the hydrocarbon sensor via the canister purge valve commanded to an open position; and indicating the hydrocarbon sensor is degraded responsive to an output of the hydrocarbon sensor below a threshold output, while drawing the blow-by gasses past the hydrocarbon sensor. In a first example of the system, the system further includes wherein the positive crankcase valve is an electronically actuatable positive crankcase valve, and where the controller stores further instructions to command the positive crankcase valve to a fully open position in order to route blow-by gasses in the crankcase to the intake manifold. A second example of the system optionally includes the first example, and further includes wherein the positive crankcase valve is a passively-actuated mechanical positive crankcase ventilation valve, and where the controller stores further instructions to manipulate pressure in the intake manifold to control the passively-actuated mechanical positive crankcase ventilation valve to a least-restrictive position in order to route blow-by gasses in the crankcase to the intake manifold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
routing blow-by gasses from a crankcase of an engine of a vehicle to an intake manifold of the engine, and then to a fuel vapor storage canister positioned in an evaporative emissions system of the vehicle; and
indicating whether a hydrocarbon sensor used for feed-forward air/fuel ratio control during purging of the fuel vapor storage canister is functioning as desired based on a response of the hydrocarbon sensor during the routing.

2. The method of claim 1, wherein routing blow-by gasses includes a key-off condition following a drive cycle where the engine was in operation to propel the vehicle.

3. The method of claim 1, wherein routing blow-by gasses to the intake manifold includes opening a positive crankcase valve positioned in a line that couples the crankcase to the intake manifold.

4. The method of claim 3, wherein the positive crankcase valve is electronically actuatable, and wherein the positive crankcase valve is electronically actuated to a fully open position to route blow-by gasses to the intake manifold.

5. The method of claim 3, wherein the positive crankcase valve is passively mechanically actuated, and wherein the positive crankcase valve is controlled to a least-restrictive position to route blow-by gasses to the intake manifold.

6. The method of claim 1, further comprising commanding fully open a throttle positioned in an intake of the engine, where the throttle is electronically actuatable, to route blow-by gasses from the crankcase to the intake manifold and then to the fuel vapor storage canister.

7. The method of claim 1, wherein routing blow-by gasses from the crankcase to the intake manifold and then to the fuel vapor storage canister further comprises actuating on a vacuum pump positioned between the fuel vapor storage canister and atmosphere, to draw a negative pressure with respect to atmospheric pressure on the intake manifold.

8. The method of claim 7, wherein the vacuum pump is positioned in a vent line between the fuel vapor storage canister and atmosphere.

9. The method of claim 8, wherein the vacuum pump is positioned in a vacuum pump conduit in parallel with the vent line, rather than in the vent line.

10. The method of claim 1, wherein indicating whether the hydrocarbon sensor is functioning as desired includes indicating the hydrocarbon sensor is degraded responsive to an output of the hydrocarbon sensor below a threshold output during the routing blow-by gasses from the crankcase to the intake manifold and then to the fuel vapor storage canister.

11. The method of claim 1, wherein routing blow-by gasses from the intake manifold to the fuel vapor storage canister includes fluidically coupling the intake manifold to the fuel vapor storage canister, and further comprises rotating the engine unfueled and without spark.

12. The method of claim 1, wherein the routing blow-by gasses from the crankcase to the intake manifold and then to the fuel vapor storage canister further comprises an indication that a load of the fuel vapor storage canister is below a threshold canister load.

13. A method comprising:
conducting a diagnostic for a hydrocarbon sensor coupled to a purge line positioned between an intake manifold of an engine and a fuel vapor storage canister positioned in an evaporative emissions system of a vehicle driven by the engine, by rotating the engine unfueled at a key-off event to direct blow-by gasses from a crankcase of the engine to the intake manifold, and then routing the blow-by gasses through the purge line past the hydrocarbon sensor en route to the fuel vapor storage canister, where the hydrocarbon sensor is indicated to be degraded responsive to a hydrocarbon sensor response to the blow-by gasses less than a threshold hydrocarbon sensor response during the routing the blow-by gasses past the hydrocarbon sensor.

14. The method of claim 13, wherein conducting the diagnostic further comprises an indication that a loading state of the fuel vapor storage canister is below a threshold canister loading state.

15. The method of claim 13, wherein directing blow-by gasses from the crankcase to the intake manifold includes fluidically coupling the crankcase to the intake manifold.

16. The method of claim 13, wherein routing the blow-by gasses through the purge line past the hydrocarbon sensor includes activating a vacuum pump positioned between the fuel vapor storage canister and atmosphere, or a purge pump positioned between the fuel vapor storage canister and the intake manifold, to draw a negative pressure with respect to atmospheric pressure on the intake manifold; and
wherein routing the blow-by gasses past the hydrocarbon sensor further comprises fluidically coupling the intake manifold to the fuel vapor storage canister.

17. The method of claim 13, further comprising controlling pressure in the intake manifold while conducting the diagnostic, where controlling pressure in the intake manifold includes controlling a position of a throttle positioned in an intake of the engine.

18. A system for a hybrid electric vehicle, comprising:
an engine including an intake, an intake manifold, and an exhaust system;
a throttle positioned in the intake;
a positive crankcase ventilation system including a positive crankcase ventilation valve positioned in a positive crankcase ventilation line, for selectively fluidically coupling a crankcase of the engine to the intake manifold;
a motor;
an evaporative emissions system including a fuel vapor storage canister, the fuel vapor storage canister selectively fluidically coupled to atmosphere via a canister vent valve positioned in a vent line;
a vacuum pump positioned in a vacuum pump conduit in parallel with the vent line;
a first check valve positioned in the vacuum pump conduit between the vacuum pump and the vent line downstream of the canister vent valve;
a second check valve positioned in the vacuum pump conduit between the vacuum pump and the vent line upstream of the canister vent valve;
a canister purge valve, positioned in a purge line, the canister purge valve selectively fluidically coupling the intake manifold to the fuel vapor storage canister;
a hydrocarbon sensor positioned in the purge line between the fuel vapor storage canister and the canister purge valve; and
a controller storing instructions in non-transitory memory that, when executed, cause the controller to:
at a key-off event where a canister loading state of the fuel vapor storage canister is below a threshold canister loading state and where a drive cycle just prior to the key-off event included engine operation:
command open the throttle and command closed the canister vent valve;
operate the motor to rotate the engine unfueled to route blow-by gasses in the crankcase to the intake manifold via the positive crankcase ventilation valve in an at least partially open position, and further operating the vacuum pump to draw the blow-by gasses past the hydrocarbon sensor via the canister purge valve commanded to an open position; and
indicating the hydrocarbon sensor is degraded responsive to an output of the hydrocarbon sensor below a threshold output, while drawing the blow-by gasses past the hydrocarbon sensor.

19. The system of claim 18, wherein the positive crankcase valve is an electronically actuatable positive crankcase valve, and where the controller stores further instructions to command the positive crankcase valve to a fully open position in order to route blow-by gasses in the crankcase to the intake manifold.

20. The system of claim 18, wherein the positive crankcase valve is a passively-actuated mechanical positive crankcase ventilation valve, and where the controller stores further instructions to manipulate pressure in the intake manifold to control the passively-actuated mechanical positive crankcase ventilation valve to a least-restrictive position in order to route blow-by gasses in the crankcase to the intake manifold.

* * * * *